(12) United States Patent
Ward et al.

(10) Patent No.: US 7,730,961 B2
(45) Date of Patent: *Jun. 8, 2010

(54) SOIL CONDITIONING DEVICE

(75) Inventors: Keith Ward, Palmyra, IN (US); Charles Stephen Carr, Salem, IN (US)

(73) Assignee: Terramanus Technologies LLC, Salem, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/345,180

(22) Filed: Dec. 29, 2008

(65) Prior Publication Data

US 2009/0200049 A1 Aug. 13, 2009

Related U.S. Application Data

(63) Continuation-in-part of application No. 11/176,569, filed on Jul. 7, 2005, now Pat. No. 7,478,684.

(51) Int. Cl.
*A01B 39/08* (2006.01)
(52) U.S. Cl. ......................................... 172/537; 172/21
(58) Field of Classification Search .................. 172/21, 172/537, 540, 554; 111/178; 301/43; 152/5, 152/300, 301, 302, 306; 404/130, 131
See application file for complete search history.

(56) References Cited

U.S. PATENT DOCUMENTS

| 895,230 | A | 8/1908 | Beier |
|---|---|---|---|
| 948,389 | A | 2/1910 | Cairns |
| 1,148,347 | A | 7/1915 | Zipay |
| 1,190,601 | A | 7/1916 | Smith |
| 1,250,570 | A | 12/1917 | Dunham |
| 1,291,772 | A | 1/1919 | Currier |
| 1,304,871 | A | 5/1919 | Garst |
| 1,402,947 | A | 1/1922 | Myers |
| 1,477,089 | A | 12/1923 | Towner |
| 1,714,852 | A | 5/1929 | Denitson, Jr. |
| 1,782,201 | A | 11/1930 | Dunham |
| 1,943,620 | A | 1/1934 | Murray |

(Continued)

FOREIGN PATENT DOCUMENTS

DE 29615079 U1 12/1996

(Continued)

OTHER PUBLICATIONS

Sunco, "State of the Art" Technology for Water Conservation and Erosion Control, Marketing Brochure, Sunco Marketing, North Platte, NE, U.S.A.

(Continued)

*Primary Examiner*—Thomas B Will
*Assistant Examiner*—Jamie L McGowan
(74) *Attorney, Agent, or Firm*—James E. Cole; Middleton Reutlinger

(57) ABSTRACT

A soil conditioning device having a series of peripheral ridge members having a leading and trailing prow shaped surface circumscribing a disc, wheel or drum. Optionally the prow shaped peripheral ridge members are joined by sub-ridge members forming a single ridge of varying heights circumscribing the disc, wheel or drum. The invention is also of a method for creating a permeable soil surface using the apparatus herein.

43 Claims, 19 Drawing Sheets

U.S. PATENT DOCUMENTS

| | | | |
|---|---|---|---|
| 2,029,872 A | 2/1936 | Johnson | |
| 2,143,471 A | 1/1939 | Booharin | |
| 2,146,222 A | 2/1939 | Pace | |
| 2,911,893 A | 11/1959 | Archibald et al. | |
| 2,966,948 A | 1/1961 | Ulsh | |
| 3,171,498 A | 3/1965 | Logan | |
| 3,207,234 A | 9/1965 | Stewart | |
| 3,297,096 A | 1/1967 | Wooldridge | |
| 3,463,063 A | 8/1969 | Caron et al. | |
| 3,650,185 A | 3/1972 | Takata | |
| 3,718,170 A | 2/1973 | Caron et al. | |
| 3,822,655 A | 7/1974 | Benedict et al. | |
| 3,891,341 A | 6/1975 | Trainor et al. | |
| 3,922,106 A | 11/1975 | Caron et al. | |
| 3,998,275 A | 12/1976 | Eisenhardt | |
| 4,066,375 A | 1/1978 | Caron et al. | |
| 4,074,942 A | 2/1978 | Cochran | |
| 4,098,349 A | 7/1978 | Jilani | |
| 4,102,406 A | 7/1978 | Orthman | |
| 4,158,392 A | 6/1979 | Belanger | |
| 4,164,190 A | 8/1979 | Newman | |
| 4,195,695 A | 4/1980 | Dixon | |
| 4,489,790 A | 12/1984 | Lattin | |
| 4,508,177 A | 4/1985 | Wiser | |
| 4,611,668 A | 9/1986 | Hrubes | |
| 4,750,792 A | 6/1988 | Caron et al. | |
| 4,844,174 A | 7/1989 | Zimmerman | |
| 4,865,400 A | 9/1989 | Caron et al. | |
| 4,905,771 A | 3/1990 | Stark | |
| 4,919,566 A | 4/1990 | Caron et al. | |
| 4,932,477 A | 6/1990 | Atwood | |
| 4,991,662 A | 2/1991 | Caron et al. | |
| 5,413,055 A | 5/1995 | Dern | |
| 5,628,372 A | 5/1997 | Creyke | |
| 5,722,493 A | 3/1998 | Dixon | |
| 5,795,097 A | 8/1998 | Caron et al. | |
| 5,967,242 A | 10/1999 | Caron et al. | |
| 6,682,262 B2 | 1/2004 | Caron et al. | |
| 6,928,941 B1 | 8/2005 | Sternitzke | |
| 6,991,401 B1 | 1/2006 | Caron | |
| 7,478,684 B2 * | 1/2009 | Ward | 172/537 |
| 2002/0000323 A1 | 1/2002 | McDonald | |

FOREIGN PATENT DOCUMENTS

| | | |
|---|---|---|
| EP | 0373467 A2 | 7/1986 |
| EP | 1495660 | 1/2005 |
| FR | 2179343 | 11/1973 |
| GB | 316739 | 8/1929 |
| GB | 1305018 | 1/1973 |
| WO | 02/32209 A1 | 4/2002 |

OTHER PUBLICATIONS

Eusebio Ventura, Jr., et al., A New Reservoir Tillage System for Crop Production in Semiarid Areas, ASAE Meeting Presentation Paper No. 032315, Jul. 2003, St. Joseph, Michigan, U.S.A.

\* cited by examiner

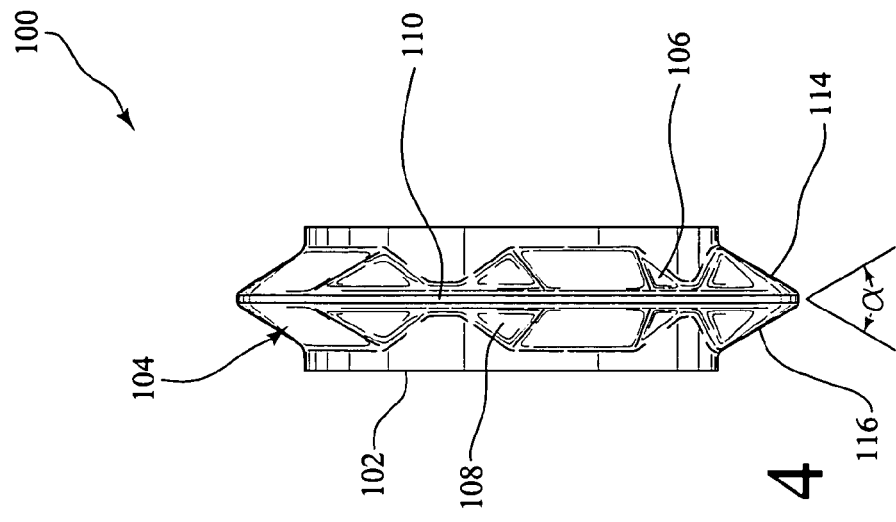
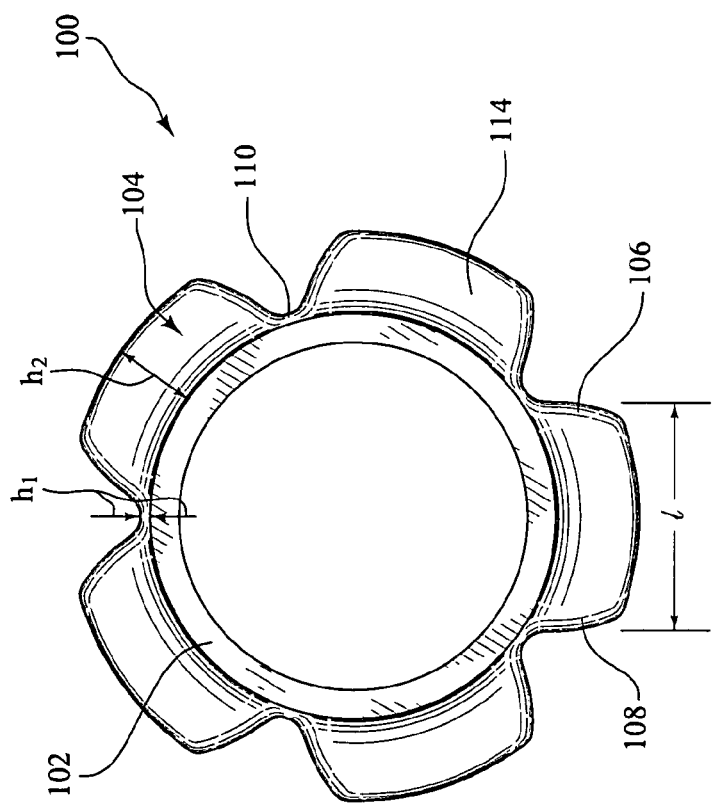
FIG. 3
FIG. 4

SOIL CONDITIONING DEVICE

CROSS-REFERENCE TO RELATED APPLICATIONS

This continuation-in-part application claims priority to and benefit from U.S. patent application Ser. No. 11/176,569, filed on Jul. 7, 2005, now U.S. Pat. No. 7,478,684, issued on Jan. 20, 2009.

BACKGROUND OF THE INVENTION

1. Field of the Invention

This invention relates to soil conservation, more specifically toward an apparatus for conditioning surface soils thereby increasing infiltration and aeration.

2. Description of the Related Art

Traditional farming comprises tasks such as plowing, disking, harrowing, seeding, fertilizing, and harvesting. During this farming process, soil is often left in a loose condition where the soil is subject to moisture evaporation and erosion. There is an increased demand to accomplish these farming tasks in a manner to conserve the soil by reducing erosion and to conserve the water by increasing the infiltration capability of the soil. Additionally, there is a demand to multitask these operations such that several tasks can be accomplished in a single pass over the land thus improving the efficiency of the farming operation and reducing costs. Due to the increasing demand for soil and water conservation as well as multitasking in farming and land management practices, it has become necessary to design machinery and supporting systems.

Traditionally, soil erosion and surface water management has been attempted with diking, imprinting and compacting systems, and reservoir tillage systems. These systems have been designed for the purpose of sealing the soil surface and/or retaining water where it falls thus reducing erosion. There are many forms of equipment available today that attempt to create irrigation pools and reservoirs in the soil surface. Examples of processes which use equipment to compact the soil into pools include furrow irrigation, diking, compacting and punching, spading and scooping, imprinting and impressing. All of these processes incorporate devices that can be mechanically driven or ground driven and can be linear or rotary in their operation. However, these traditional processes and associated devices fall short of providing a system or device which reduces erosion, reduces water runoff, increases water infiltration, allows multitasking and fail to leave the surface soil in a better prepared seedbed.

Imprinting and compacting devices compact the soil to overcome erosion by creating pools. These devices require excessive weight to be applied perpendicular to the soil surface, allowing the soil structure to be impressed in order to make their imprints. An example of an imprinting machine is the Dixon Wheel Roller™ which is designed to have the required weight to overcome the soils surface structure in order to make an impression. As a result of the compaction, the soil surface is sealed which causes the soil surface to become substantially impervious to water infiltration and limits aeration activity reducing oxygen.

Compaction in soil is the direct result of weight applied to the soil surface as well as rainfall. Compaction occurs quite frequently on farmland because of the type of equipment used, such as a moldboard plow or imprinting, harvest transportation equipment and compacting devices. Further compaction is caused by high traffic, tractors, carts, etc. or rainfall striking the soil surface and wind rolling fine particles across the flat soil surface. This compacted soil surface is commonly known as hard pan crusting and as the area increases downward, a hard pan is formed. When weight is applied to the soil, the soil structure is compressed and soil particles are commonly arranged by the compression into unfavorable growing condition formats or consistency. The greater the weight or load to the soil, the greater the amount of compaction or unfavorable segregation. Compaction causes the surface soil to become compressed to such a level that it becomes substantially sealed and impervious to water and air filtration. The top soil below the compacted surface soil is consequently substantially sealed off and has little water or air for infiltration. This in turn leads to a reduction in replenishing of water in the underlying aquifer which has contributed to the current water supply problems seen globally. Additionally, farmers need use equipment such as Rippers™, SubSoilers™, or Pan Busters™ to penetrate below the hard pan and fracture it to allow moisture to infiltrate and therefore promote healthy root systems on the crops. This practice does little to provide a system which reduces water runoff, increase water infiltration, or allow multitasking.

More recently, imprinting type machines have been designed to require less weight to make an impression in the soil surface in an effort to overcome some of the associated problems. Even though these more recently designed machines are lighter than the Dixon Wheel™ and other similar devices, they are all still relatively heavy and still produce many of the problems previously described such as decreased water infiltration capabilities of the soil and decreased aeration.

Soil diking systems and devices have been designed to overcome some of the problems associated with the imprinting and compacting systems. Diking is accomplished by scooping, digging, and/or dragging the soil which is then left in a loose condition to form pools or reservoirs. Less weight is needed for diking than imprinting or compacting devices in an attempt to leave the soil surface more pervious to water. However, when water is applied to the loose soil it impacts and dislodges the fine particles of soil and organic matter on the sides of the dikes and washes them into the bottom of the pools. These particles of soil then seal the bottom of the pools which reduces the infiltration capability of the soil and diminishes the reduction of runoff Additionally, the loose soil is eroded from the field in both light and heavy rainfall events. The fine particles eroded have fertilizer and pesticides attached to them which then moves offsite and is undesirable.

Another recent attempt to provide soil and water conservation in farming has been the practice of no-till farming. No-till farming is where the soil is left undisturbed from harvesting to planting. Planting is accomplished in a narrow seedbed or slot created by disc openers. Coulters, residue managers, seed firmers, and modified closing wheels are used on the planter to provide adequate seed to soil contact. However, there are several disadvantages associated with no-till. No-till requires the use of herbicides to eliminate competition from weeds which raises production costs. Crop residue left on the soil hinders soil warming and drying, making planting more difficult and reduces seed germination. Conventional tillage systems cannot be used to incorporate fertilizers and herbicides. The heavy residue or foliage left on the land may result in poor seed soil contact thus reducing seed germination. Also, the soil surface is not left in a highly permeable state resulting in rain water runoff and reduced infiltration to subsurface soils and the underlying aquifer.

Most recently, reservoir tillage systems such as the one taught in U.S. Pat. No. 5,628,372 ('372) have been devised to overcome the problems associated with the aforementioned farming practices. '372 teaches an agricultural instrument having a series of multifaceted peripheral ridge members having flat leading and trailing edges selectively spaced circumscribing a disc. The ridge members have a flat circumferential section spacing therebetween. The configuration of the '372 device compacts the soil to form water retaining pools in the soil from the vertical impact of the ridge member on the soil upon rotation. This compaction reduces aeration and water infiltration into the soil. Additionally, the flat trailing edge of the multifaceted peripheral ridge member pitches the soil at rotation velocities necessary for efficient farming practices. This pitching of the soil fills in the created pools with fine particles that seal the bottom of the pools which further reduces the infiltration capability of the soil. Furthermore, pitching of the soil destroys a portion of the structure of the pool leading to early failure of the remaining pool structure.

There remains a need for improving soil and water conservation as well as providing for efficient farming practices, such as multitasking, and land management practices.

SUMMARY OF THE INVENTION

The present invention is comprised of a soil conditioning device having a series of prow shaped peripheral ridge members optionally joined by sub-ridge members circumscribing a disc, wheel or drum. When the soil conditioning device is rolled across the soil surface, a series of consolidated prow shaped hollows and optional weir formations are created in the soil enhancing soil permeability and reducing water runoff. The primary purpose of the soil conditioning device is enabling the soil to retain rain water where it falls and consequently reduce erosion and increase aeration, water retention and infiltration of the soil and provide for multitasking capabilities.

The soil conditioning device is a rotary device which can be attached to most any existing agricultural and horticultural machine and may also be attached to any specially designed machine for use in construction, mining or other situations which require earthworks, including home gardening. Several soil conditioning devices may be adjacently aligned to form a soil conditioning tool in the form of a cylindrical roller having a plurality of soil conditioning devices. The device or tool is driven or rolled while being in contact with the ground forming a series of prow shaped hollows and optional adjoining weirs. Additionally, the soil conditioning device or tool can be fitted with a ratchet release, break or clutch device, or can be driven mechanically from a variety of sources at speeds necessary for multitasking.

The soil conditioning device is comprised of a relatively lightweight material. Such materials may include wood, polyurethane foam, rubber, silicon rubber, synthetic rubber, Hytrel™, urethane, various plastics or polymeric materials, and combinations thereof. Preferably, the soil conditioning device is manufactured from plastic or polymeric materials such as high density polyethylene (HDPE), polyvinyl chloride, vinyl, or other such moldable plastic materials. HDPE has been found to be advantageous since it is a material which is light weight, strong, flexible and exhibits self cleaning capabilities when applied to the soil. Linear Low Density Polyethylene (LLDP) has also been found to be advantageous since it is a low cost polymer having highly flexible qualities and possessing great durability. Optionally, the use of UV-stabilizers such as carbon black may be added to improve its weather resistance. Combinations of various polymeric materials have also exhibited the desired properties of being relatively lightweight and a having a degree of flexibility. Further unique polymers such as Teflon type polymers may be added that provide a high resistance to soil sticking to the surface of the wheel. In addition to other types of light weight material list in this section such as wood, rubber, etc, materials such as stainless steel, iron, or newer classes of ceramics may be formed into the leading and trailing prow shaped sections of the wheel to assist in the clod breaking activities of the wheel. Additionally, these materials used in the top $\frac{1}{8}^{th}$ to $\frac{1}{4}^{th}$ inch of the top edge of the ridge member improve the wear and life of the tool.

The soil conditioning device is molded producing a circular outer skin having a series of prow shaped peripheral ridge members optionally joined by sub-ridge members surrounding a hollow core. This design and material of manufacture allows the shape, hardness, and weight to be adjusted at its point of use by a farmer or other user for various soil types. This adjustability enables it to work efficiently in a variety of conditions. The adjustment is accomplished by filling the hollow core through a valve in the soil conditioning device. The core may be filled with compressed air or other gases, water or other liquids, gels, solids, expanding foam, a mixture of air and water, or any combination thereof to obtain the desired shape, hardness, and/or weight.

The soil conditioning device molds or consolidates the soil upon which it is rolled by applying light pressure to the soil surface in a substantially horizontal direction so as to lightly consolidate or bind the outermost surface of the soil together. Consolidating the soil surface lightly sticks the outermost surface soil particles together leaving a porous permeable soil surface for greater infiltration capabilities. As the device travels through the soil, the soil flows over and around the various component surfaces of the device restructuring the soil to a desired form. While the soil flows over and around the various surfaces, the soil is caused to lift and flow in a bow wave fashion behind the device or tool having a plurality of devices. While the soil is in the flowing state, the device is rotating within the soil flow and forming, ushering, and gently kneading the soil while ushering it into place producing a series of consolidated hollows and optional weirs, therefore leaving the soil surface in a "Geometric Ordered Roughness (GOR), necessary for the control of erosion caused by water and wind, in a process known as "Hydroforming". This process of consolidating the soil requires little or no additional pressure or force perpendicular to the soil surface thus providing little or no compaction to the surface soil. The consolidation is accomplished in a substantially lateral direction and shapes a structure in the soil consisting of various curves and angles forming prow shaped hollows and optional adjoining weirs which increases the soil surface area. The increase in permeability and surface area of the soil surface both contribute to the increase in soil infiltration and consequent reduction in erosion. Additionally, the prow shape of the ridge allows for the device to be operated at speeds necessary for efficient farm practices.

The soil conditioning device of the present invention consolidates the soil surface into a series of permeability or porous prow shaped hollows and optional adjoining weirs controlling water flow and increasing the surface area of the soil contacting rain water thus increasing the effective infiltration rate of the soil. These prow shaped hollows and optional adjoining weirs are designed to slow and/or stop flowing water while allowing it to infiltrate the soil. These structures are consolidated evenly over their entire surface of the soil increasing the surface area of the soil and increasing the infiltration rate of the soil. Additionally, increase surface area increases soil warming from the sun allowing for improved seed germination. Below this molded or consolidated surface, the soil structure remains loose thus allowing water to percolate throughout the soil. These prow shaped hollows and optional adjoining weirs increased porosity, infiltration rate, and water absorbing capability of the soil directly reducing erosion of the soil by substantially eliminating and/or slowing water runoff. Additionally, surface ponding on fields is reduced since rainfall or irrigation water is more easily absorbed by the soil having a higher porosity and surface area in contact with the water. Further, aeration of the soil is also increased.

The soil conditioning device has many applications and benefits. It is capable of working on most all soil types and agricultural applications, such as planting, surface water control, soil warming, reducing wind erosion, cultivating and plowing, or common construction applications, such as scraping, building berms, reclaiming land, or even creating meridians between interstate highways.

BRIEF DESCRIPTION OF THE DRAWINGS

FIG. 3 is a side view of the soil conditioning device of FIG. 1 showing the relative size of the prow shaped ridge members and subridge members circumscribing a wheel.

FIG. 4 is a front view of the soil conditioning device of FIG. 1 showing the angle between opposing sides of the prow shaped ridge members circumscribing a wheel.

DETAILED DESCRIPTION

Figure 1:
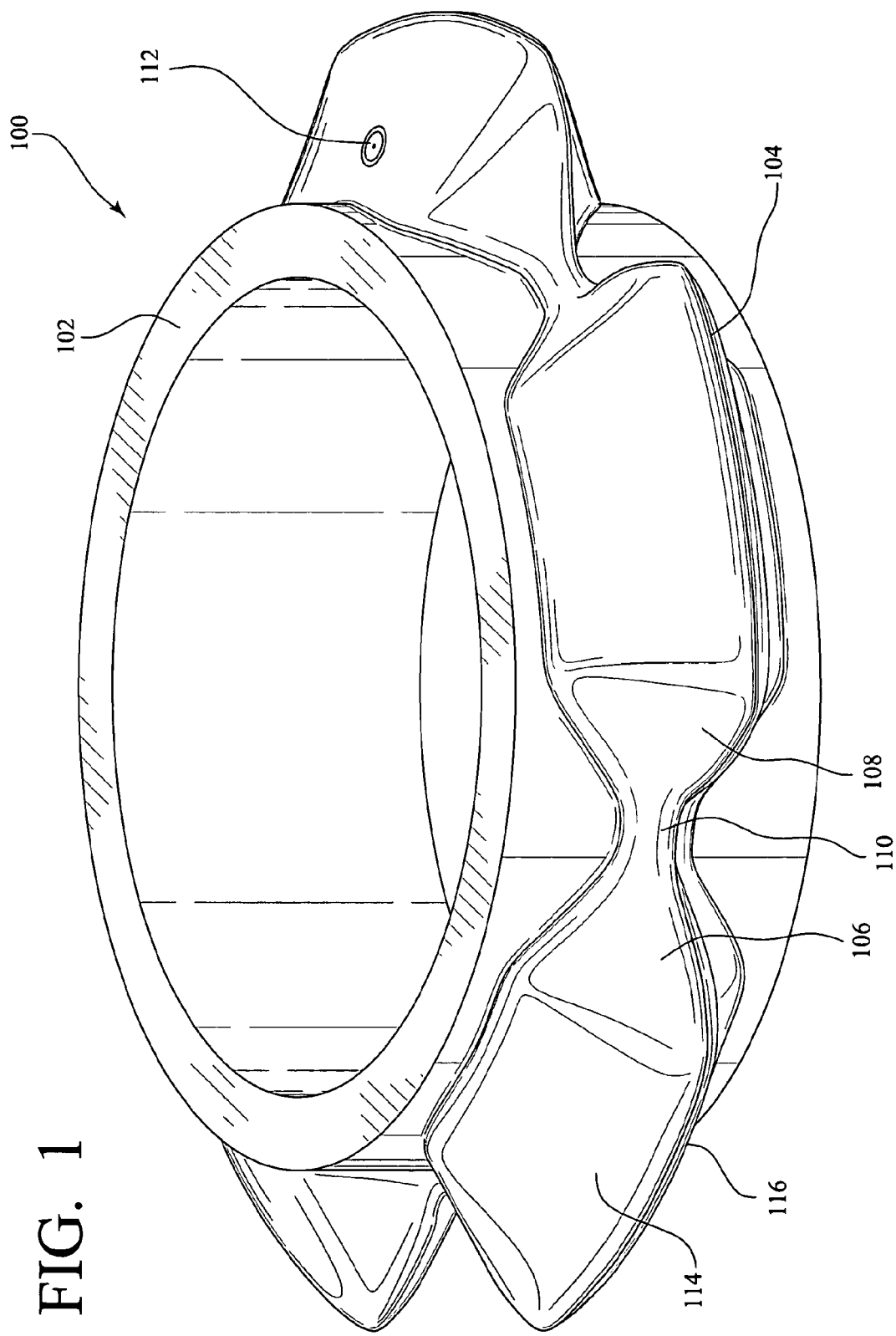
FIG. 1 is a perspective view of the soil conditioning device of the present invention showing the prow shaped ridge members and subridge members circumscribing a wheel.

FIG. 1 shows soil conditioning device 100 having a series of prow shaped peripheral ridge members 104 joined by sub-ridge members 110 circumscribing wheel or disc 102. Each of the plurality of ridge members 104 has a leading prow shaped surface 106 and a trailing prow shaped surface 108. Spanning between each leading surface 106 and trailing surface 108 is a subridge member 110. This embodiment of the soil conditioning device may also be described as a wheel member 102 having a central continuous outer peripheral ridge of varying heights about wheel member's 102 circumference. The peripheral ridge is formed by prow shaped peripheral ridge members 104 having leading prow shaped surface 106 and trailing prow shaped surface 108. Ridge members 104 are joined or interposed by sub-ridge members 110 and have a rounded top surface and side walls 114 and 116 sloping toward wheel member 102.

Soil conditioning device 100 is shown circumscribing wheel 102 and being of a unitary material having a hollow interior. Preferably, soil conditioning device 100 is formed with a polymeric material. More preferably, the polymeric material forming the soil conditioning device of the present invention is high density polyethylene. Optionally, a UV-stabilizer such as carbon black may be added to the polymeric material to improve its weather resistance.

Valve 112 is shown is shown in a sloping sidewall 114 of ridge member 104 and provides injection access to the inner core of device 100. Compressed air or other gases, liquids, gels, solids, or any combination thereof may be injected into the inner core through valve 112 to obtain a desired shape, hardness, and/or weight of device 100.

Rolling soil conditioning device 100 upon the soil surface creates a permeable soil surface having a series of weirs and an increased surface area improving infiltration and controlling water flow thereupon. The soil surface is consolidated improving resistance to movement of soil particles by moving water while increasing permeability thus increasing infiltration capability of the soil. The weirs slow and direct the flow of water upon the soil surface, resulting in a cascading effect. This cascading effect reduces the inertia of the flowing water minimizing the soil's erosion. These soil structures increase the soil surface area and decrease water run-off.

Figure 2:
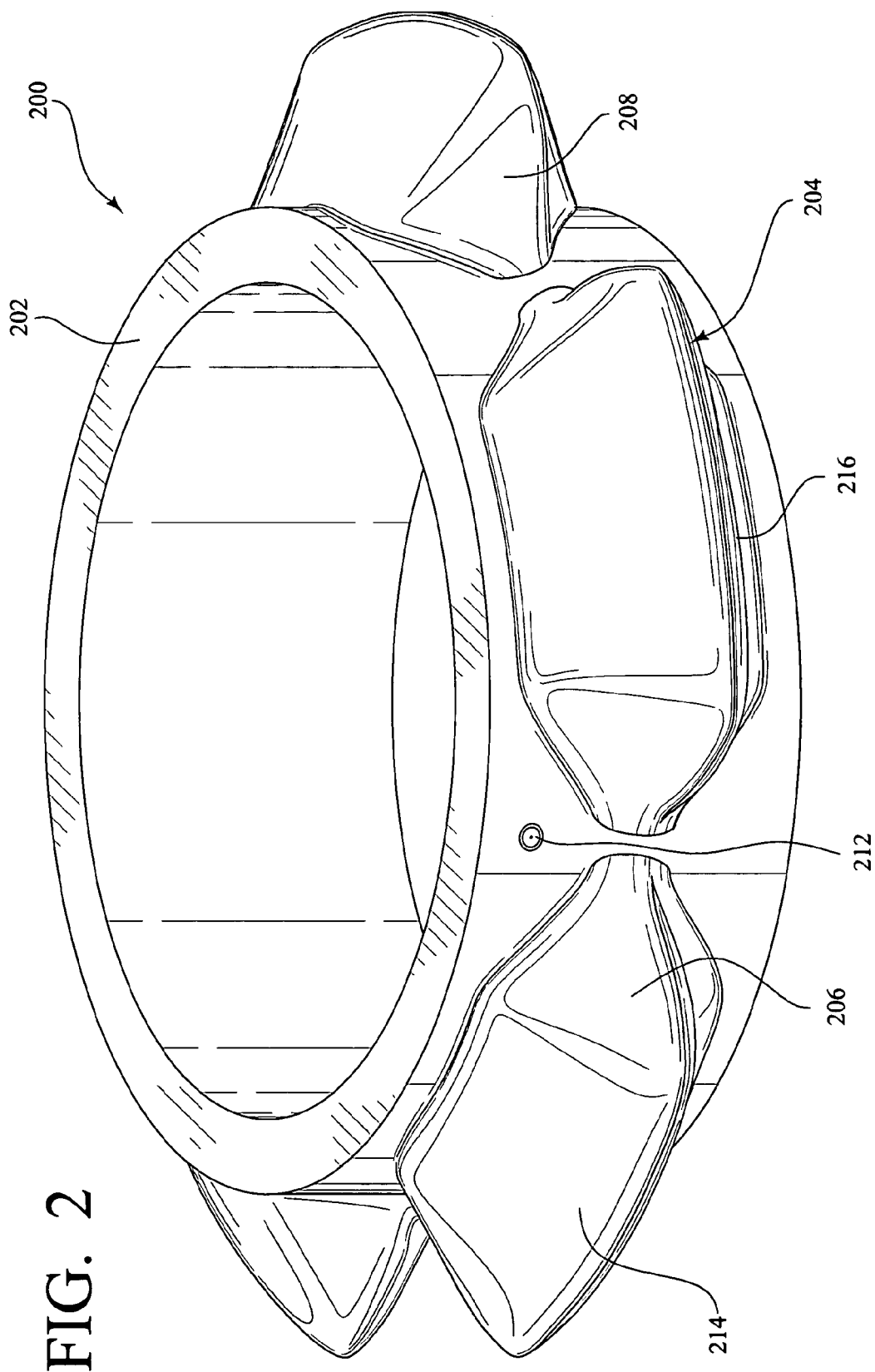
FIG. 2 is a perspective view of an embodiment of the soil conditioning device of the present invention showing a plurality of spaced prow shaped ridge members circumscribing a wheel.

FIG. 2 shows soil conditioning device 200 having a plurality of prow shaped peripheral ridge members 204 selectively spaced about a peripheral surface of disc or wheel or disc 202. Each of the plurality of ridge members 204 has a leading prow shaped surface 206 and a trailing prow shaped surface 208. Soil conditioning device 200 may also be described as wheel member 202 having a series of central disjointed outer peripheral ridge members 204 wherein each peripheral ridge member 204 has a prow shaped leading end 206, a prow shaped trailing end 208, and two opposing sloping sidewalls 214 and 216 sloping toward wheel 202.

Soil conditioning device 200 is shown circumscribing wheel 202 and being of a unitary material having a hollow interior. Optional valve 212 is shown in wheel 202 providing material access to the core of device 200. Rolling soil conditioning device 200 upon the soil surface consolidates the surface soil laterally into a series of preselectively spaced prow shaped hollows.

FIG. 3 shows soil conditioning device 100 of FIG. 1 having prow shaped ridge members or sections 104 interposed with subridge members or sections 110 circumscribing wheel or disc 102. Interposed ridge members 104 and subridge members 110 form a central continuous outer peripheral ridge of varying heights circumscribing wheel 102. Ridge sections 104 are of a primary height $h_2$ and subridge sections 110 are of a secondary height $h_1$. Primary height $h_2$ is greater than secondary height $h_1$. Preferably, $h_2$ exceeds $h_1$ in a range of approximately 1.5 inches to 5 inches. Also in this embodiment, each ridge section 104 has a primary height $h_2$ extending continuously about the circumference of wheel 102 (1) in a range of about 5 inches to 10 inches.

FIG. 4 shows a front view of soil conditioning device 100 with prow shaped ridge members 104 and subridge members 110 circumscribing wheel 102. Shown here are opposing side walls 114 and 116 of ridge member or section 104 having an angle α therebetween. Preferably angle α is in a range of approximately 40° to 80°, and more preferably is approximately 60°.

Figure 5:
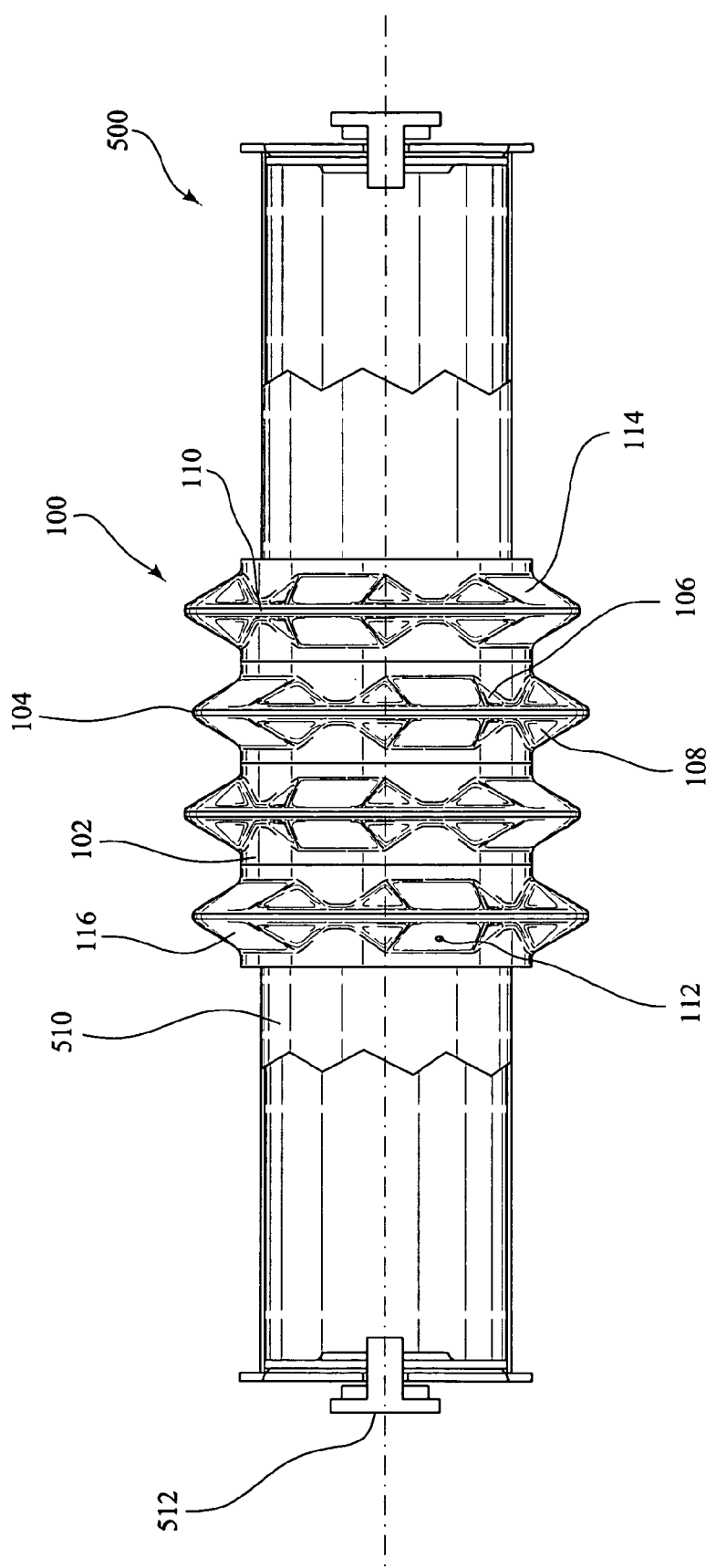
FIG. 5 is a front view of a soil conditioning tool incorporating a plurality of the soil conditioning devices of FIG. 1.

FIG. 5 shows soil conditioning tool 500 incorporating a plurality of the soil conditioning devices 100. Soil conditioning devices 100 are axially aligned and retained forming cylindrical rolling tool 500. In the embodiment shown, soil conditioning devices 100 are adjacent one another in a staggered ridge member 104 alignment. However, soil conditioning devices 100 may be in a spaced configuration on cylindrical roller 510 and may as well be in a configuration having ridge members 104 aligned radially about cylindrical roller 510. Attaching hubs 512 extend axially from each end of cylindrical roller 510 for rotatingly attaching to a transport means such as a tractor or as the last device in a multitasking train of farming tools, or optionally placed in various positions within the train of farming tools, providing for an efficient method of soil and water conservation easily incorporated into current farming practices.

Figure 6:
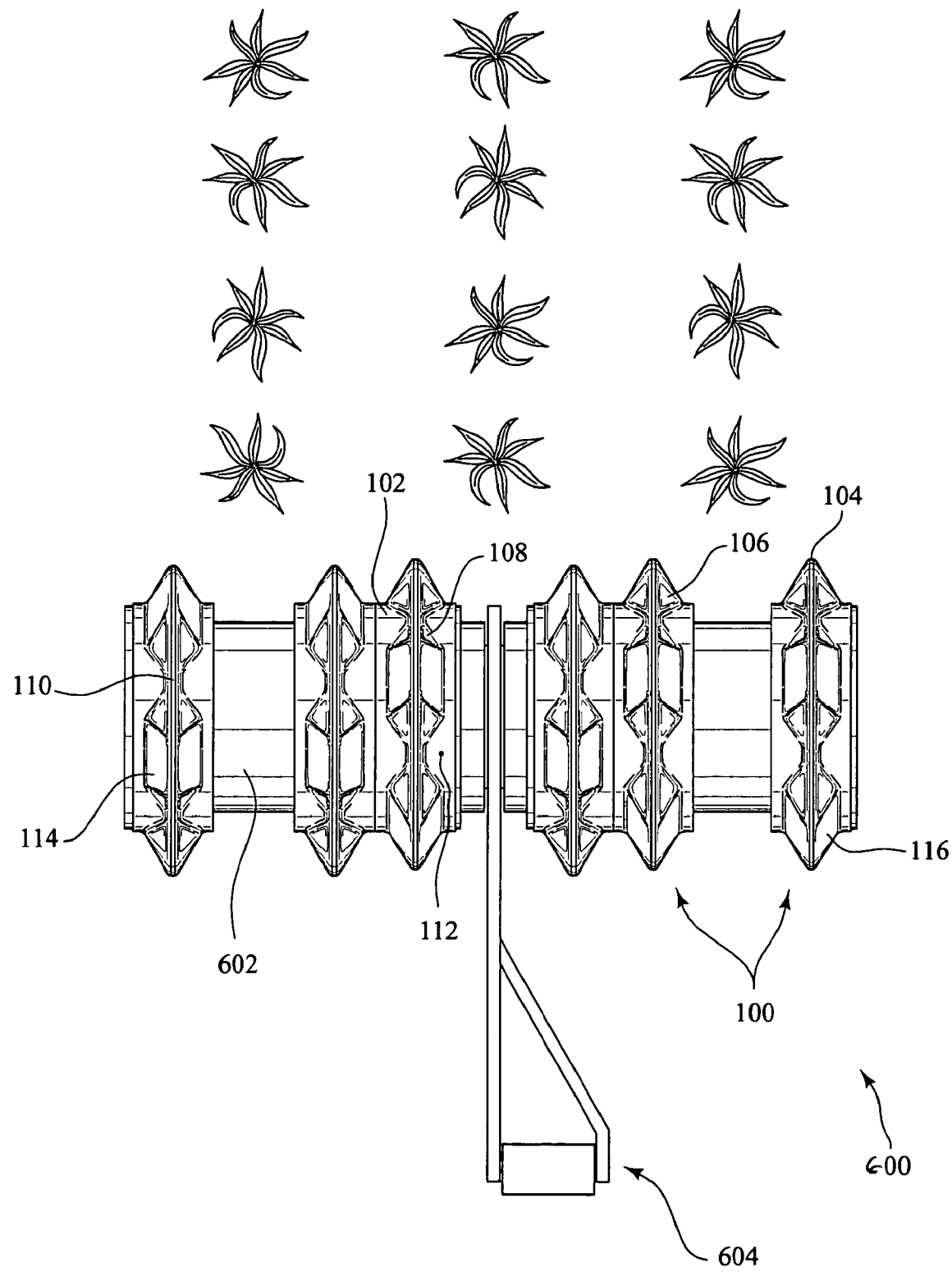
FIG. 6 is a top view of a soil conditioning tool incorporating a plurality of the soil conditioning devices of FIG. 1 for use after planting.

FIG. 6 shows a top view of soil conditioning tool 600 incorporating a plurality of the soil conditioning devices 100 of FIG. 1 for use after planting. Soil conditioning devices 100 are axially aligned, spaced, and retained forming cylindrical rolling tool 600. A plurality of pairs of soil conditioning devices 100 are adjacent one another in a staggered ridge member 104 alignment on cylindrical roller 602. However, soil conditioning devices 100 may be spaced having three, four or even more soil conditioning devices 100 adjacently aligned and the spacing between adjacent devices 100 may vary depending upon the size of the plants. Cylindrical roller 602 may be in a configuration having ridge members 104 aligned radially about cylindrical roller 602. Attaching arm 604 extends radially from a center portion of cylindrical roller 602 for rotatingly attaching to a transport means such as a tractor or as the last device in a multitasking train of farming tools.

Figure 7:
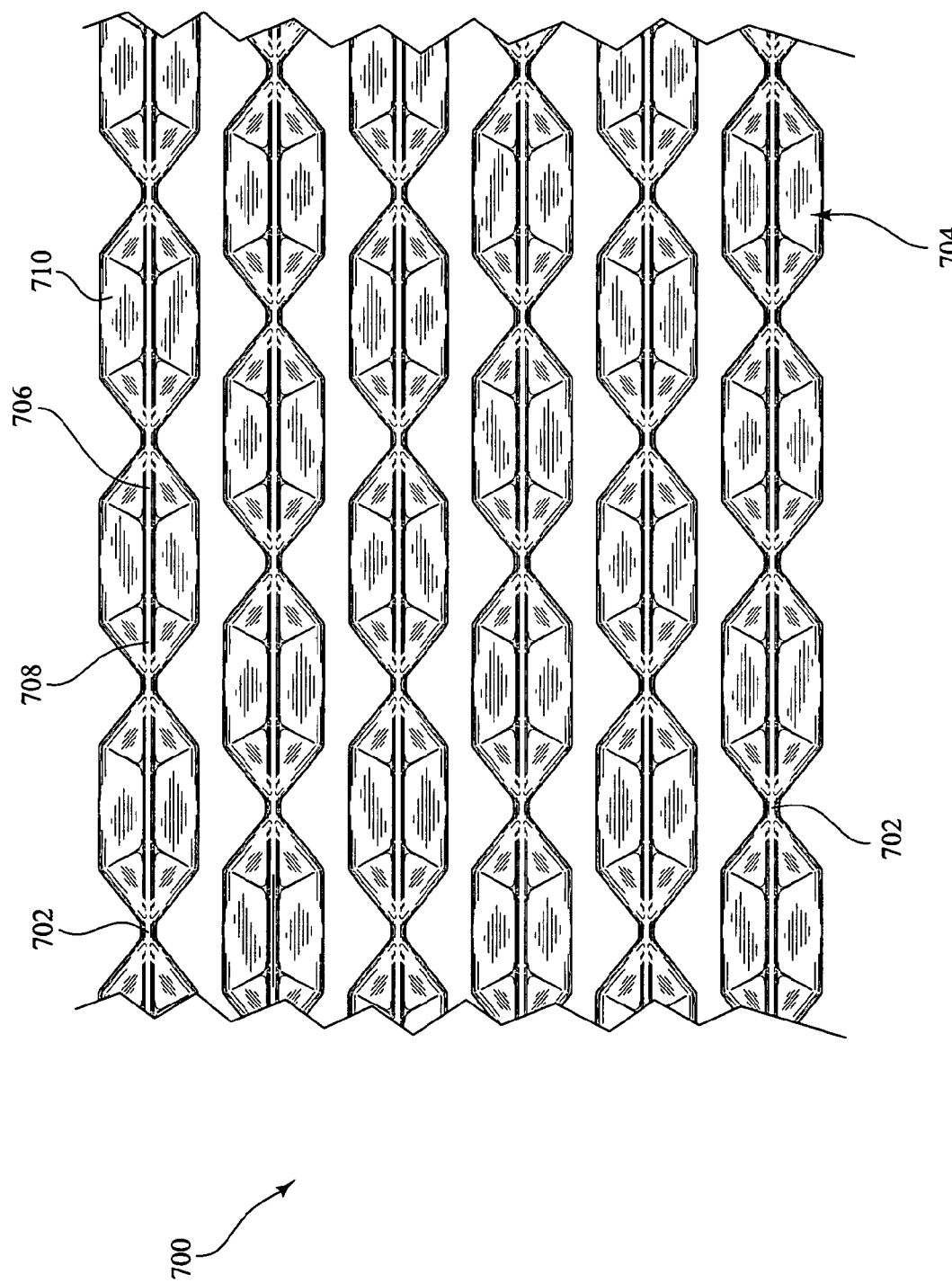
FIG. 7 is a top view of a soil imprint formed by the tool of FIG. 5.

FIG. 7 shows a top view of soil imprint 700 formed by soil conditioning tool 500 of FIG. 5. Having soil conditioning tool 500 driven or rolled upon the surface soil while being in contact with the ground consolidates the soil into a series of prow shaped hollows 704 and adjoining weirs 702. Leading end 708, mid-section 710, and trailing end 706 make up hollow 704 and are formed by sections or walls 106, 114, 116, and 108 of device 100 respectively.

Figure 8:
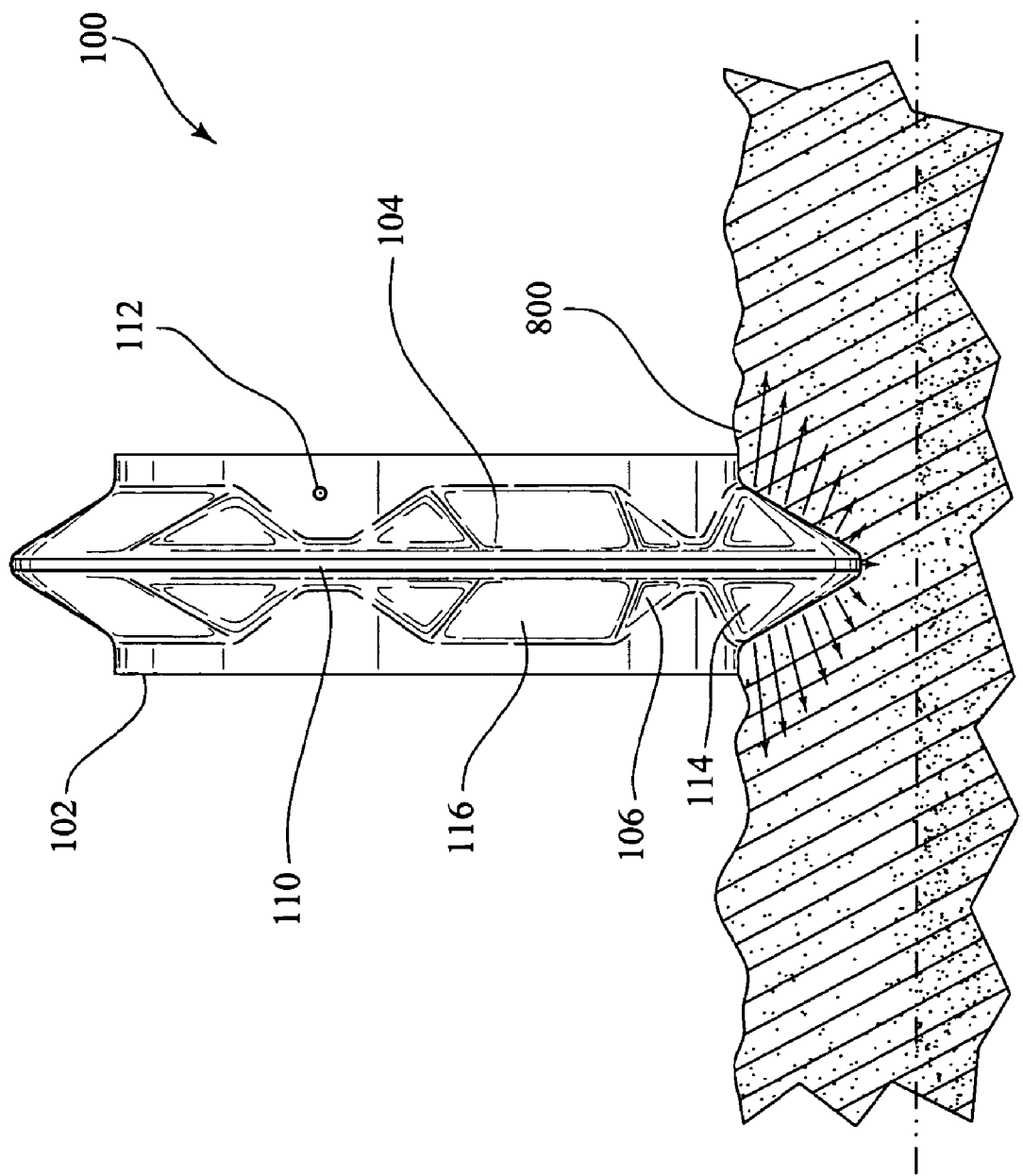
FIG. 8 is cross-sectional view of soil being consolidated by the device of FIG. 1.

FIG. 8 shows a cross-sectional view of soil being conditioned by soil conditioning device 100 of FIG. 1. Shown here are force vectors 800 primarily in a lateral direction consolidating the soil surface. As device 100 rolls upon the land, leading prow shaped surface 106 makes contact with the soil and as device 100 continues to roll, leading prow surface 106 and ridge member 104 laterally consolidates the soil as shown by force vectors 700. Having prow shaped leading edge 106 first contacting the soil allows the soil to be consolidated with less than about fifty pounds force per ridge member 104. Additionally, having trailing surface 108 in a prow shape allows device 100 to move about the soil surface at speeds of up to about 14 mph without throwing or pitching the soil.

Figure 8A:
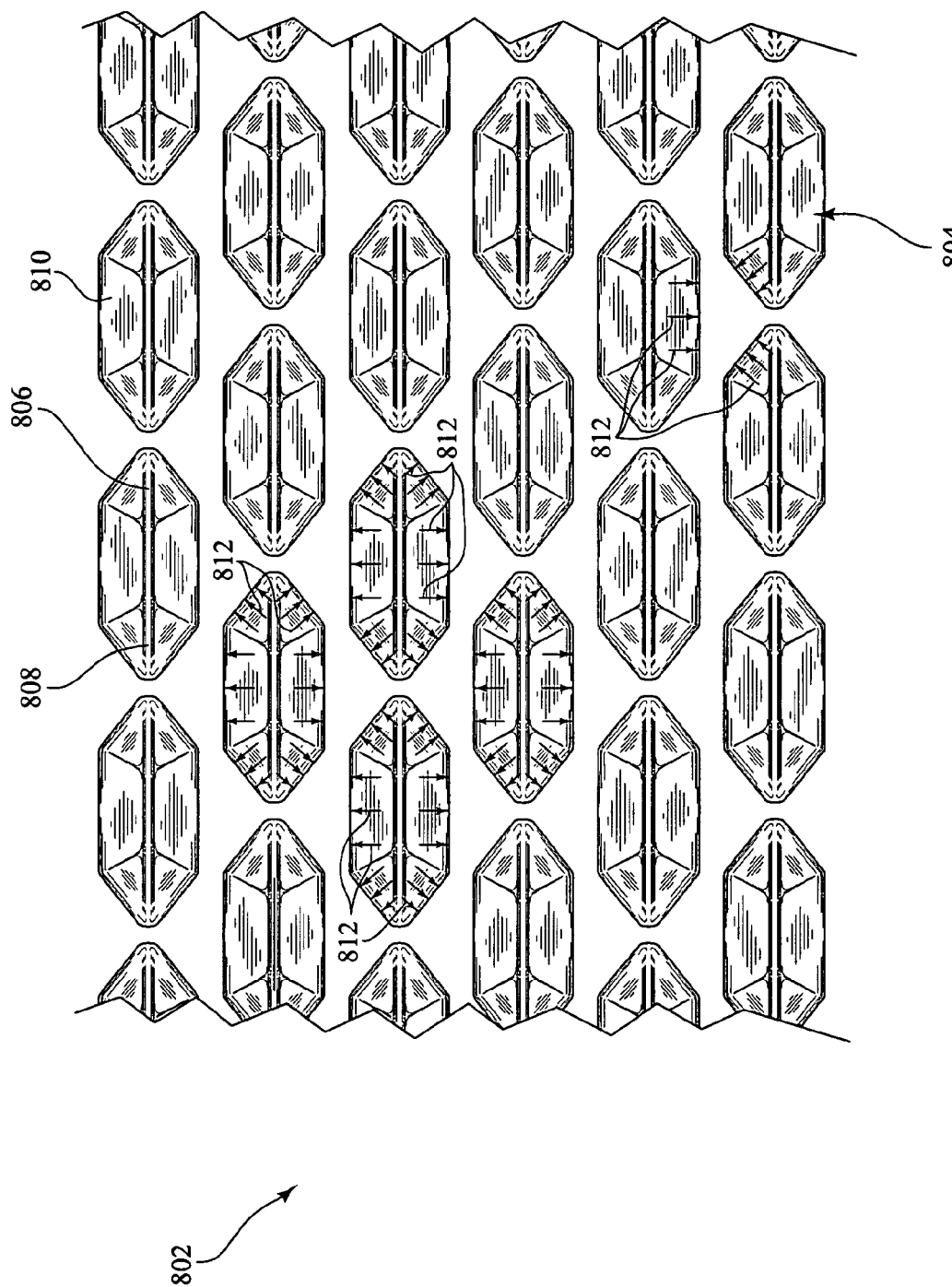
FIG. 8a is a top view of the soil having been consolidated by the device of FIG. 2.

FIG. 8a shows a plan view of the soil having been conditioned by soil conditioning device 200 of FIG. 2. Shown here are force vectors 812 indicating the lateral direction of consolidation and primarily showing the forward and rearward direction of consolidation achieved by the prow shaped ridge members 204 forming a series of prow shaped hollows 804. Prow shaped hollows 804 have leading end 808, mid-section 810, and trailing end 806 and are formed by sections or walls 206, 214, 216, and 208 of device 200 respectively.

Figure 9A:
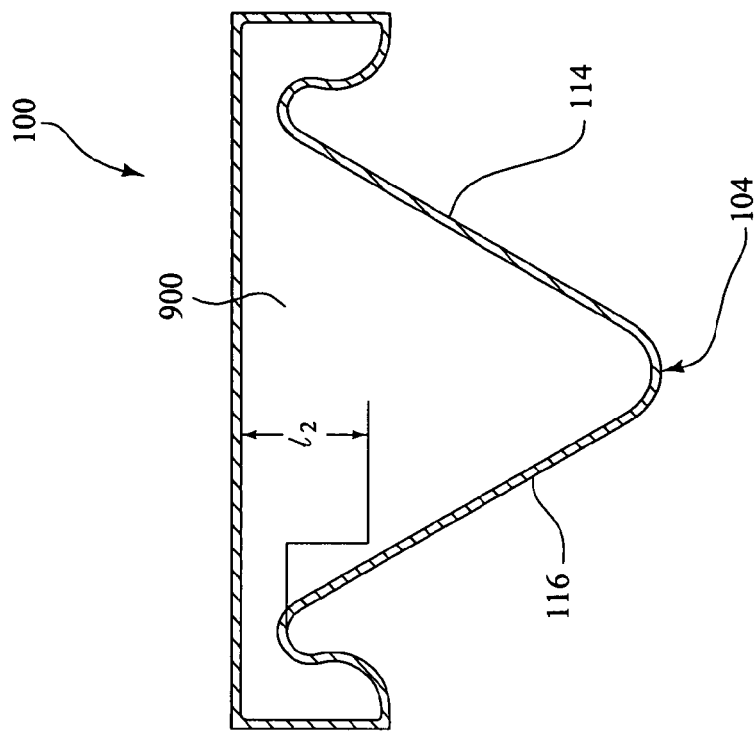
FIG. 9a is a cross-sectional view of a soil conditioning tool in a retracted state.
Figure 9:
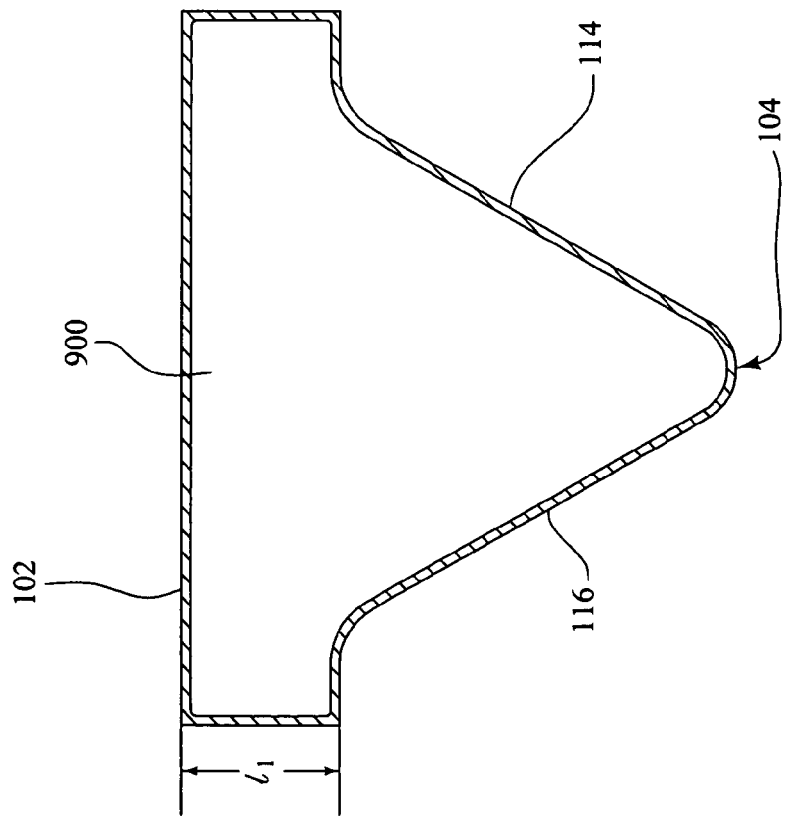
FIG. 9 is a cross-sectional view of a soil conditioning tool in an expanded state.

FIGS. 9 and 9a show a cross-sectional view of soil conditioning device 100 in an expanded state and a retracted state respectively. Having soil conditioning tool 100 comprised of a flexible material such as a polymeric material and formed having a hollow center or cavity allows ridge member 104 to retract when device 100 encounters a radial force as is likely when device 100 encounters a rock or other hard material within the surface soil. The force required to retract ridge member 104 within device 100 may be adjusted by filling core 900 of device 100 with compressed air or other gases, liquids, gels, solids, or any combination thereof to obtain a desired hardness. This retractability of ridge member 104 provides that a substantially consistent horizontal force within the surface soil is provided, hence uniform consolidation is achieved. A retraction of $l_1$ less $l_2$ is possible without substantially altering the configuration of ridge members 104.

The instant soil conditioning device has a series of prow shaped peripheral ridge members optionally joined by subridge members circumscribing a disc, wheel or drum and a method for creating a permeable soil surface. The prow shape peripheral ridge members consolidate the soil in varying degrees from the top of the impression to the bottom of the impression which increases water infiltration and reduces soil erosion. At the top of the impression the soil is at a greater risk of erosion by surface water run-off, therefore the soil is consolidated to a greater degree. At the bottom of the impression the risk of erosion is considerably reduced and as a maximum infiltration rate is required to absorb the accumulating water, the soil is consolidated to the minimum to enable the soil to stay in place, allowing maximum percolation of the accumulating water by interstitial flow. Moreover, aeration of the soil is increased thus allowing a more complete working of the three primary elements necessary for healthy plant production, those being hydrogen, oxygen and carbon. When the soil conditioning device is moved on the land the prow shaped ridge member enters the soil sweeping the soil sideways so as to consolidate the soil laterally. This is in contrast to compacting the soil as is the case in more traditional devices. Furthermore, as the device leaves the soil, this sideways sweeping action consolidates the soil laterally at the front of the impression leaving the impression in a stable condition structurally and allowing for the maximum water infiltration and percolation. This is in contrast with the more traditional systems where the soil is left loose and highly erodible as the devices exit the soil.

Figure 10:
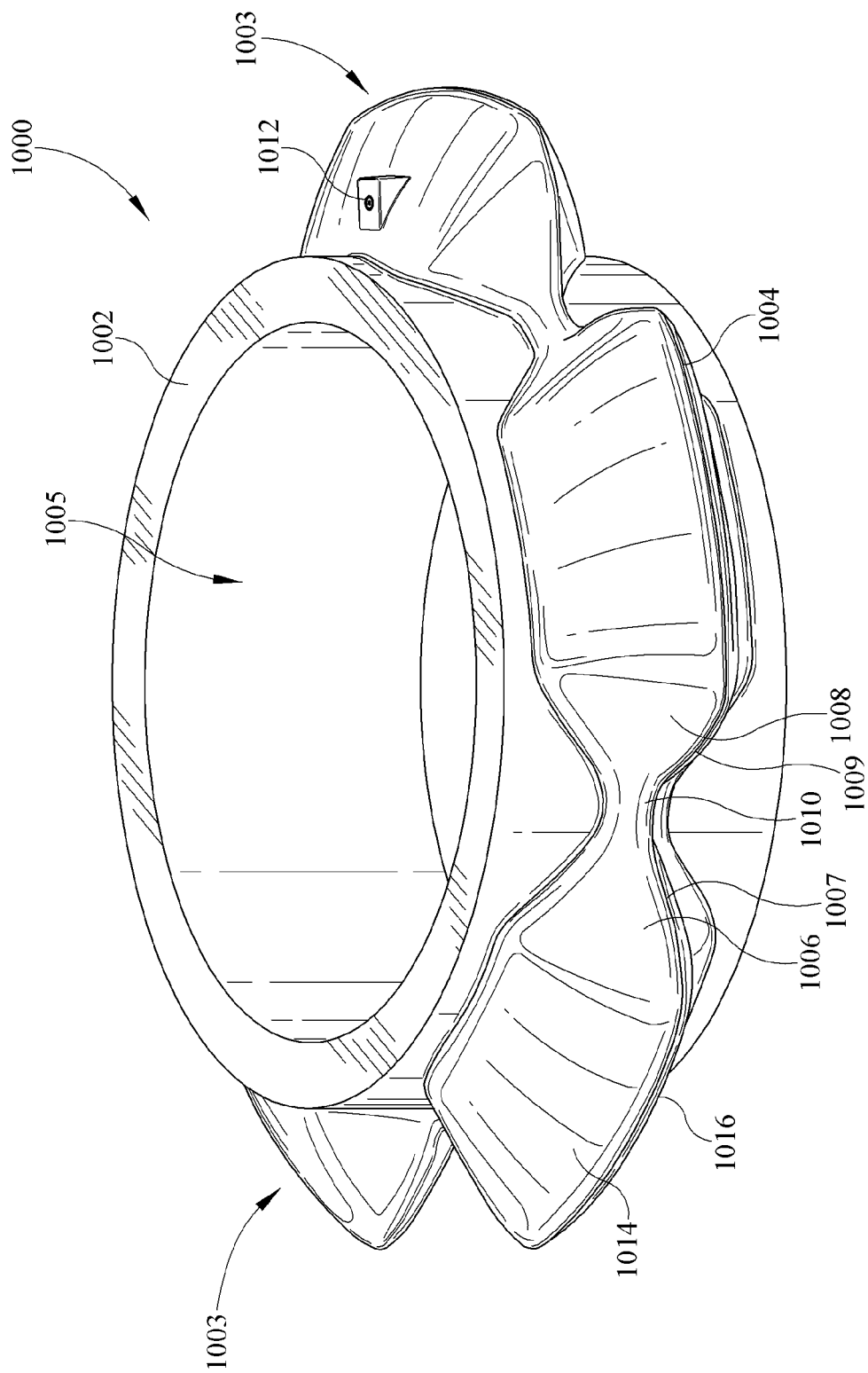
FIG. 10 is a perspective view of a first alternative soil conditioning device.

Referring now to FIG. 10, the soil conditioning device 1000 is depicted in perspective view. The soil conditioning device 1000 includes a plurality of prow-shaped peripheral ridge members 1003 joined by a plurality of subridge members 1010 defining a continuous ridge about the soil conditioning device 1000. The ridge members 1003 and sub-ridge members 1010 circumscribe the wheel or disk 1002. The wheel 1002 is a generally hollow annular body having a peripherally outer surface from which the ridge members 1003 and the subridge members 1010 extend. The wheel member 1002 further comprises a central opening wherein, according to the instant embodiment, an axle or other driving member may be positioned for operably mounting the soil conditioning device 1000.

Each of the plurality of ridge members 1003 includes a leading prow-shaped surface 1006 and a trailing prow-shaped surface 1008. The prow shaped surfaces 1006, 1008 are generally convex in shape and curved about two perpendicular axes. Leading and trailing ends further comprise leading and trailing edges 1007,1009 respectively. Disposed between the leading prow-shaped end 1006 and trailing prow shaped end 1008 is a first side wall surface 1014 and a second side wall surface 1016. The first side wall surface 1014 and the second side 1016 wall surface join at upper ends to form an upper edge 1004. The upper edge 1004 is rounded about two axes, from leading end 1006 to trailing end 1008 and from side wall 1014 to sidewall 1016.

The sidewalls 1014, 1016 which are also substantially rounded about at least two axes between the leading prow-shaped surface 1006 and the trailing prow-shaped surface 1008. The sidewalls 1014, 1016 extend from the rounded top surface or edge 1004 to the peripheral surface of the wheel member 1002. The sidewalls 1014, 1016 are curved from the upper edge 1004 to the outer surface of the annular body 1002. The sidewalls 1014, 1016 are also curved from a leading edge of the leading prow shaped end 1006 to the trailing edge of the trailing prow shaped end 1008.

At least one of the peripheral ridge members 1003 or the annular wheel 1002 includes a valve 1012. The valve 1012 allows a fluid to be inserted within the soil conditioning device 1000 as previously described. The fluid may be chosen from any of the previously described fluids, such as air or other compressed gas, as well as liquids. As previously described, the peripheral ridge members 1003, the subridge members 1010 and the annular body 1002 are both substantially hollow and therefore are in fluid communication. The fluid pressure may be higher for soils which are compacted and less for soils which are closer to a consolidated state. The fluid pressure may range from atmospheric pressure to five (5) pounds per square inch (psi).

Figure 11:
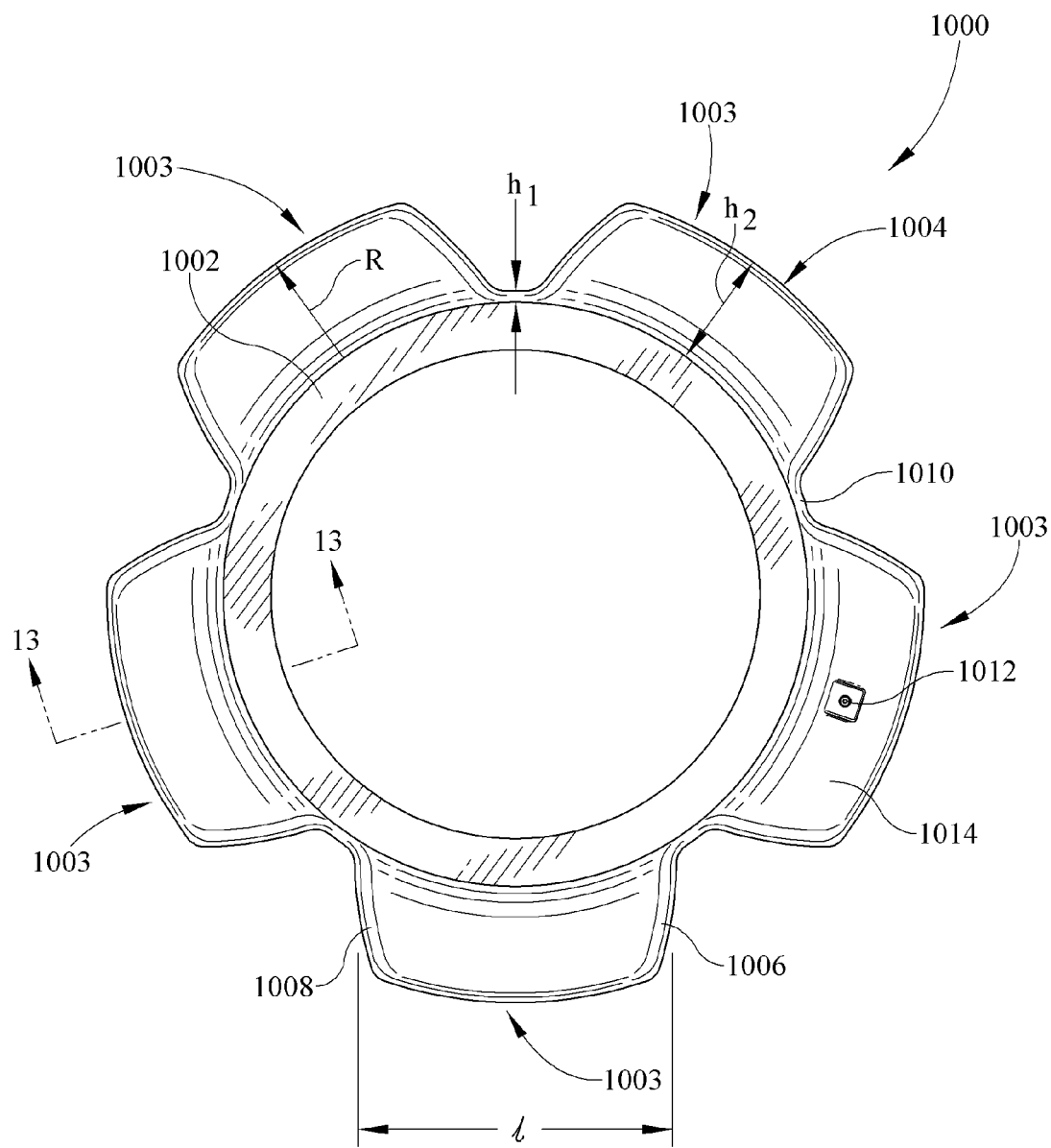
FIG. 11 is a side view of the soil conditioning device of FIG. 10.

Referring now to FIG. 11, the soil conditioning device 1000 is depicted in a side view. Radially inward of the sidewall 1002, the device is substantially hollow, as previously described. The ridge members 1004 extend radially outwardly from the periphery of the wheel or disk 1002. Extending between the ridge members 1004 are the sub-ridge members 1010. The sub-ridge members 1010 have a first height from the peripheral edge from the wheel 1002 indicated as $h_1$. The ridge members 1004 have a second height indicated as $h_2$ wherein the height $h_2$ is greater than $h_1$.

The outer edge 1004 of the ridge members is positioned at radius R. The radius R may be constant or may vary generally along the upper edge 1004 between the leading edge 1006 and trailing edge 1008. Therefore, the height h2 may vary depending on the position along the upper edge 1004. Each ridge member 1003 has a length generally indicated as L. According to the instant embodiment, due to the length L and the circumference of the wheel 1002, the ridge members 1003 are equally spaced about the circumference of the annular body 1002.

Figure 12:
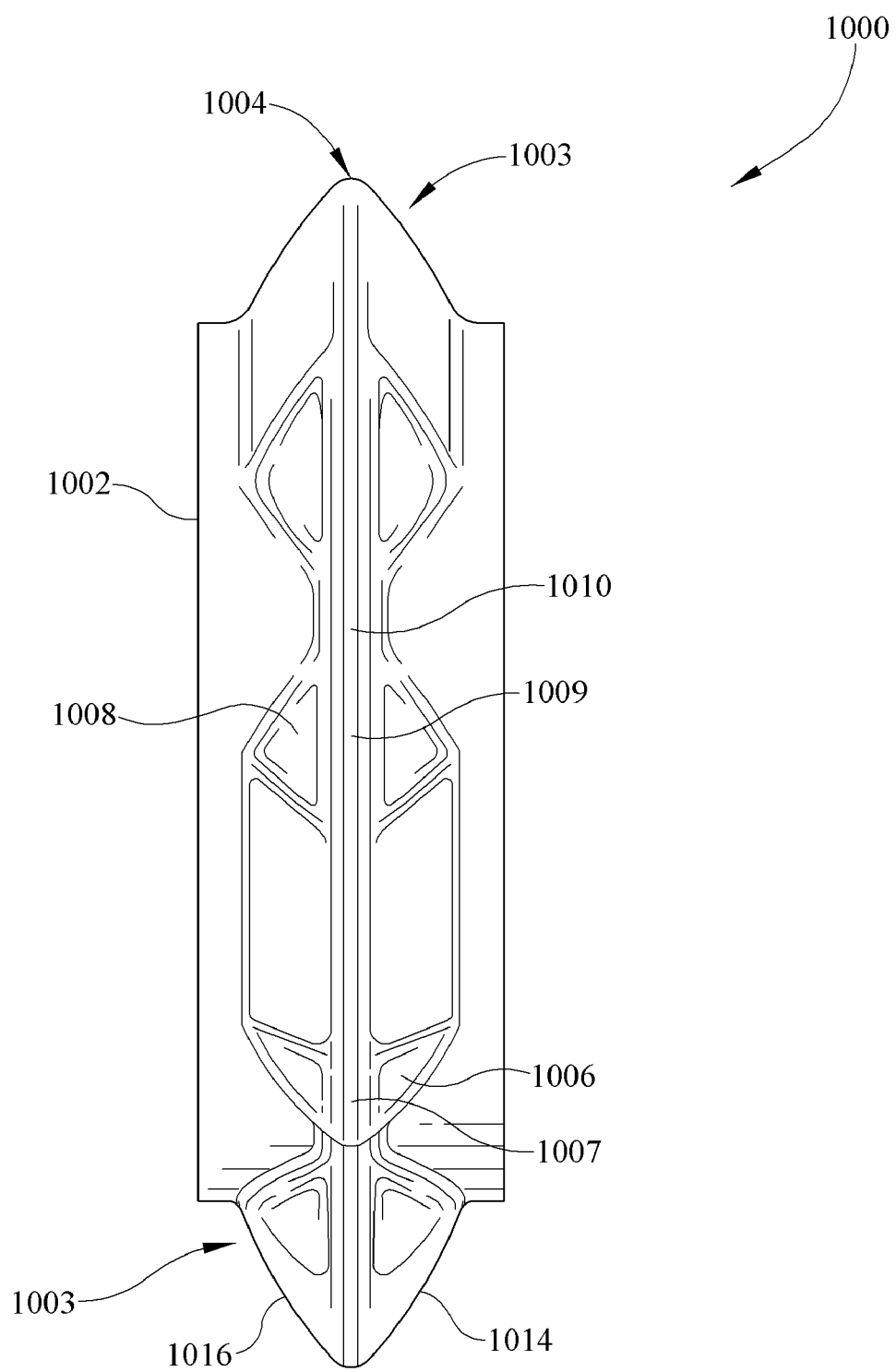
FIG. 12 is an end view of the soil conditioning device of FIG. 10.

Referring now to FIG. 12, the soil conditioning device 1000 is depicted in an end view. The ridge members 1004 extend from the peripheral surface of the wheel member 1002. Extending between the ridge members 1004 is the sub-ridge member 1010. Each ridge member 1004 has a leading prow-shaped surface 1006 and a trailing prow-shaped surface 1008. The terms leading and trailing are with respect to the rotation of the soil condition device 1000. The side surfaces 1014, 1016 of each ridge member 1003 are curved about at least two axes. The side surfaces 1014, 1016 are rounded from the upper edge of the ridge member 1004 to the surface of the wheel member 1002. This curvature is about a substantially horizontal axis. Additionally, the surfaces 1014, 1016 are curved about a vertical axis extending between the prow-shaped leading end 1006 and prow-shaped trailing end 1008.

The leading prow-shaped end 1006 and trailing prow-shaped end 1008 each also have a leading edge 1007 and a trailing edge 1009, respectively. The leading and trailing ends 1006, 1008 between the sidewalls 1014, 1016 and the edges 1007, 1009 may be curved about two perpendicular axes so that the surfaces 1006, 1008 have a convex appearance. Similarly, the edges 1007, 1009 are curved about a vertical axis and a horizontal axis. Alternatively, the prow-shaped ends 1006, 1008 may be substantially planar between the sidewalls 1014, 1016 and either of the edges 1007, 1009.

Figure 13:
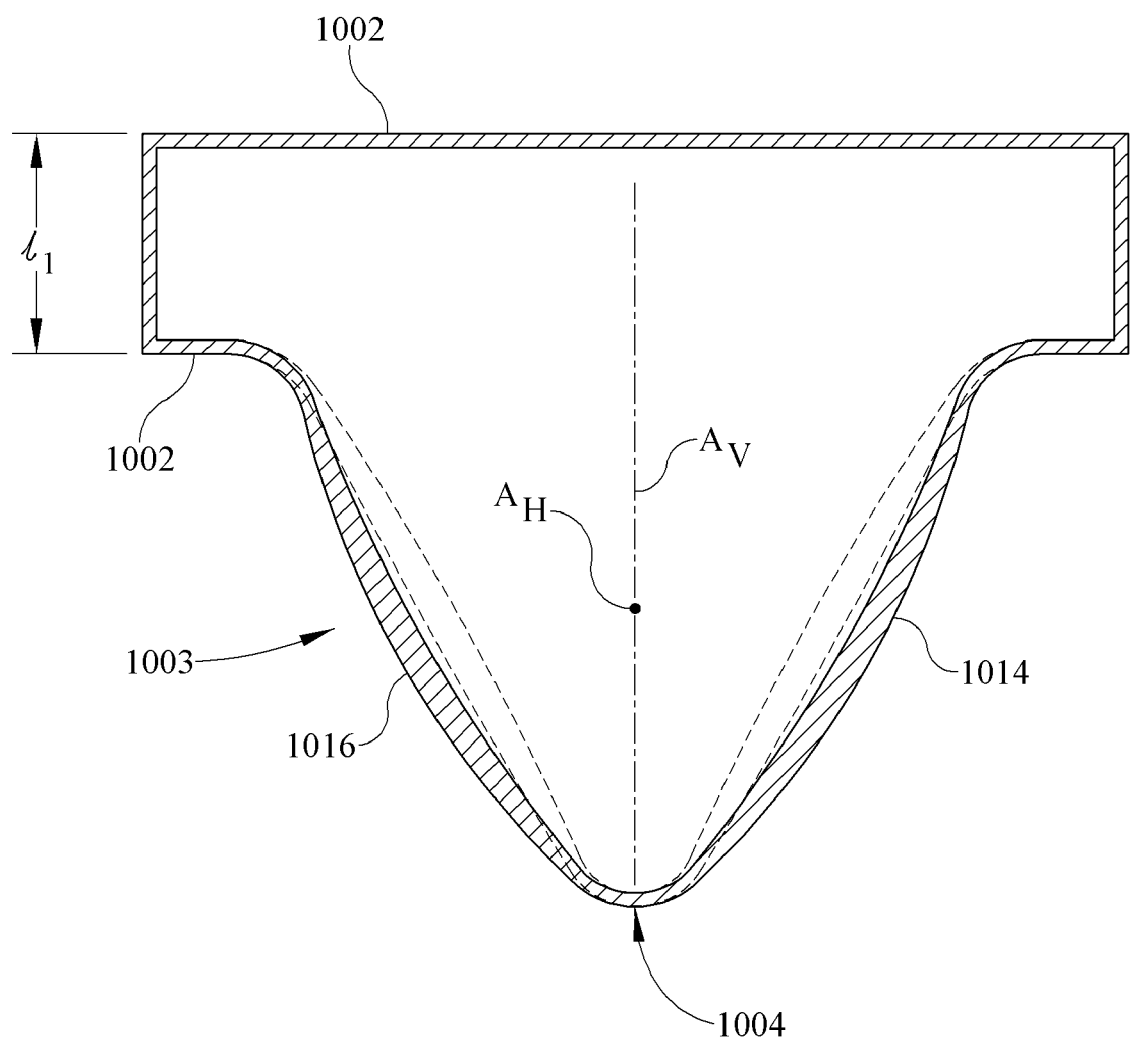
FIG. 13 is a cross-sectional view of the soil conditioning device of FIG. 10.
Figure 14:
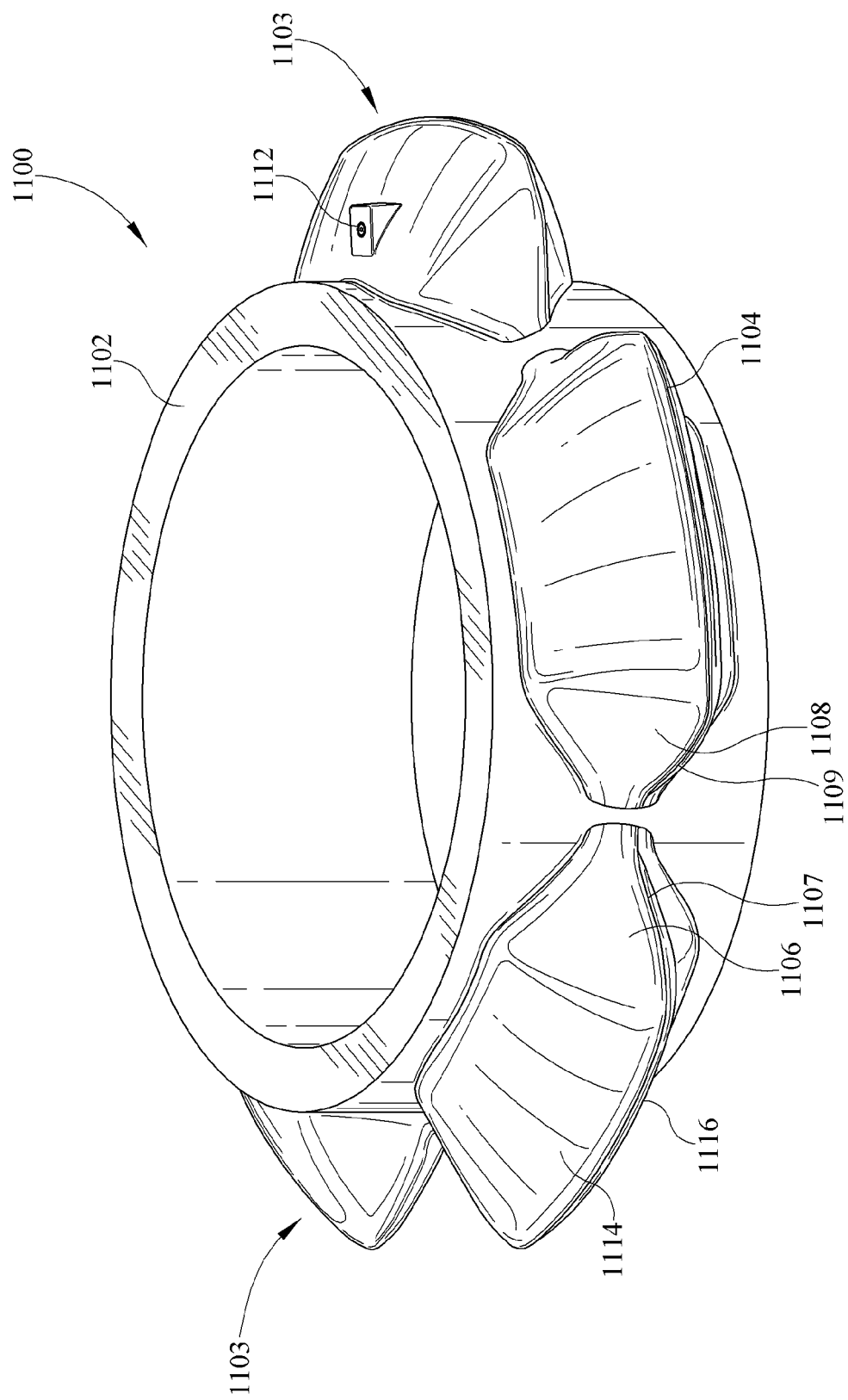
FIG. 14 is a perspective view of a second alternative embodiment of a soil conditioning device.

Referring now to FIG. 13, a sectional view of the soil conditioning device 1000 is depicted. The section view clearly depicts the curvature of the sidewalls 1014, 1016 which are curved about a horizontal axis $A_H$ from the upper edge of the sub-ridge 1004 to the peripheral surface of the wheel or disk member 1002. Additionally, the vertical axis Av is depicted which shows the axis about which the sidewalls 1014, 1016 also curve along the ridge member 1003 between the leading end 1006 and trailing end 1008.

The curvature of the sidewalls 1014, 1016 is due to the pressurization of the hollow portion of the soil conditioning device 1000. This pressurization may be, as previously described, due to compressed air or some other fluid. The side wall surfaces 1014, 1016 are also depicted pushed inwardly in broken line. The side walls 1014, 1016 are depressed upon engagement with soil as the ridge member 1003 moves therethrough. Additionally, each peripheral member 1003 may also be retracted some amount as shown in FIG. 9a. This will depend on the soil type, soil moisture content, and the degree of the soil's bulk density, being conditioned by the soil conditioning device 1000 and the pressure of any fluid located within the device 1000.

Referring now to FIGS. 14-17, an alternative embodiment of the soil conditioning device is depicted. The soil conditioning device 1100 comprises an annular wheel or disk member 1102. The wheel or disk 1102 has an outer peripheral surface from which a plurality of ridge members 1103 extend. Contrary to the embodiment of FIGS. 10-13, the present embodiment of the soil conditioning device 1100 does not utilize the intermediate sub-ridge members. Accordingly, each of the ridge members 1103 extend fully at leading and trailing edges to the surface of the wheel 1102 and are not interposed by the subridge members (FIG. 10).

As with the previous embodiment, each ridge member 1103 includes sidewalls 1114 and 1116. Each of the sidewalls 1114, 1116 is curved about at least two axes. The sidewalls 1114, 1116 join an upper edge to define an upper ridge member edge 1104. As with the previous embodiment, the sidewalls 1114, 1116 may have thickness which varies from the upper edge 1104 to the outer surface of the annular body 1102. Each ridge member 1103 further comprises a leading prow-shaped end 1106 and a trailing prow-shaped end 1108. The leading and trailing ends 1106, 1108 are defined by the rotational direction of the soil conditioning device 1100. The leading and trailing ends 1106, 1108 further comprise edges 1107, 1109 where surfaces meet. The edges 1107, 1109 and the surfaces defining the ends 1106, 1006 may be curved about perpendicular axes.

Figure 15:
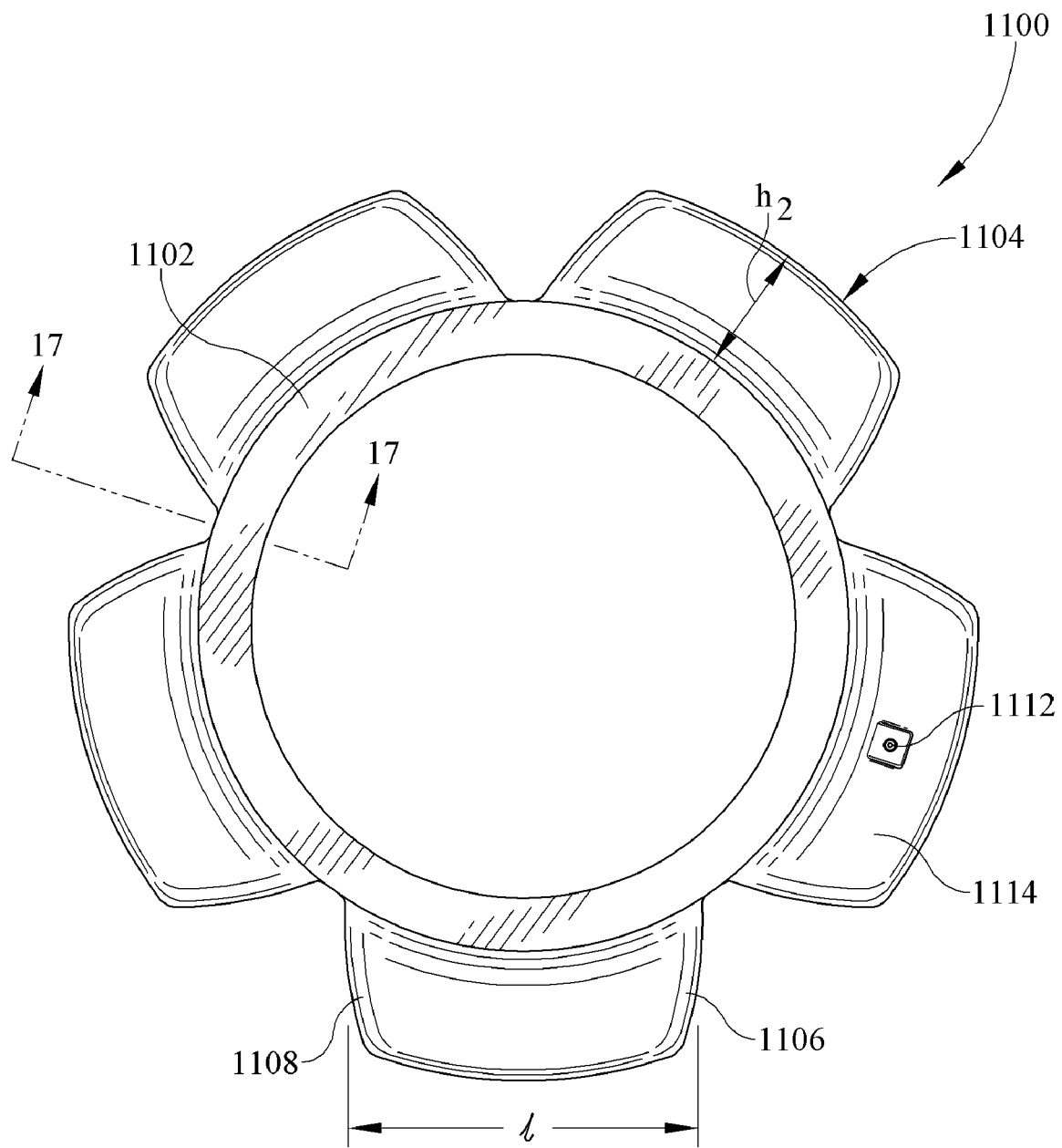
FIG. 15 is a side view of the soil conditioning device of FIG. 14.
Figure 16:
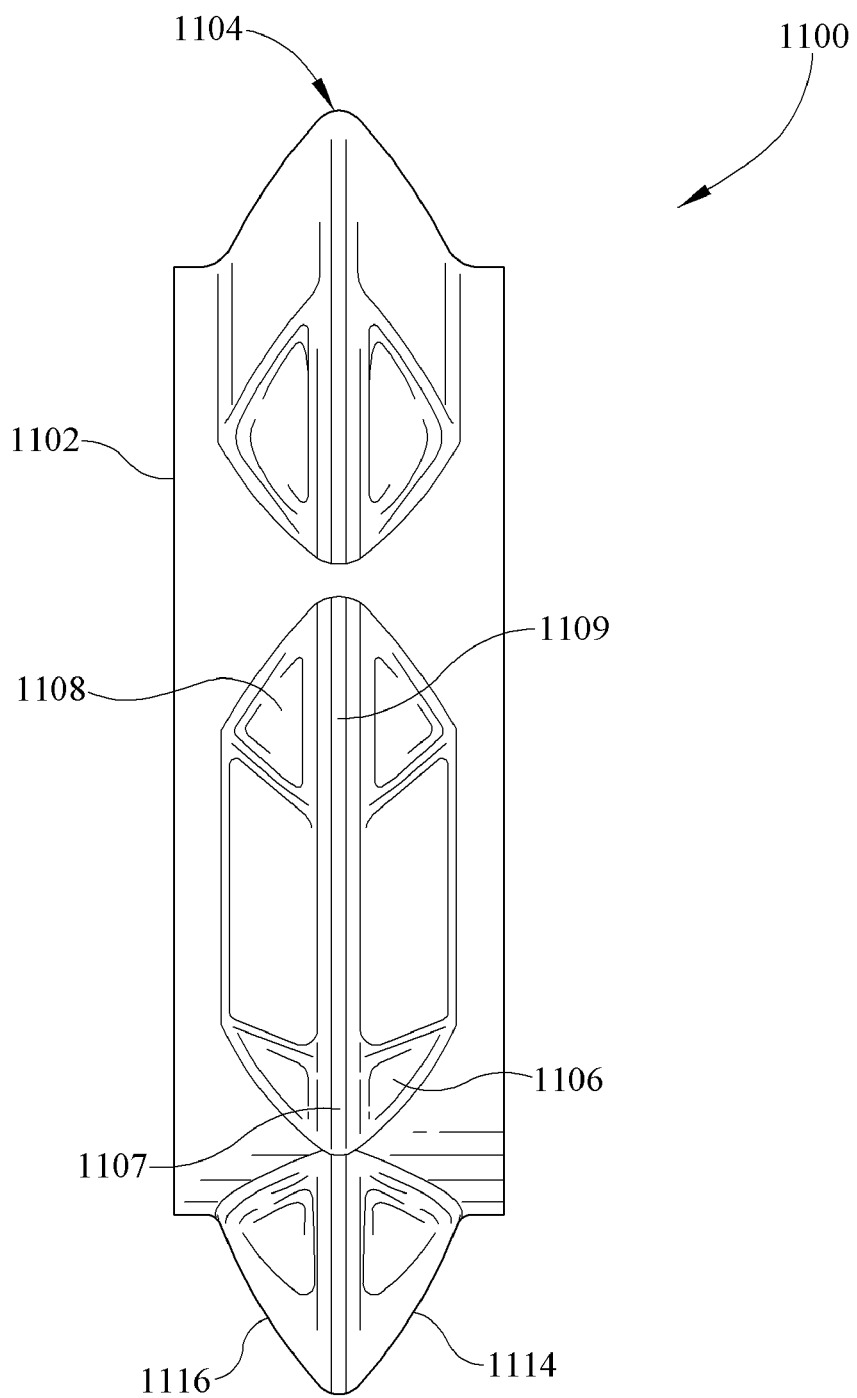
FIG. 16 is an end view of the soil conditioning device of FIG. 14.
Figure 17:
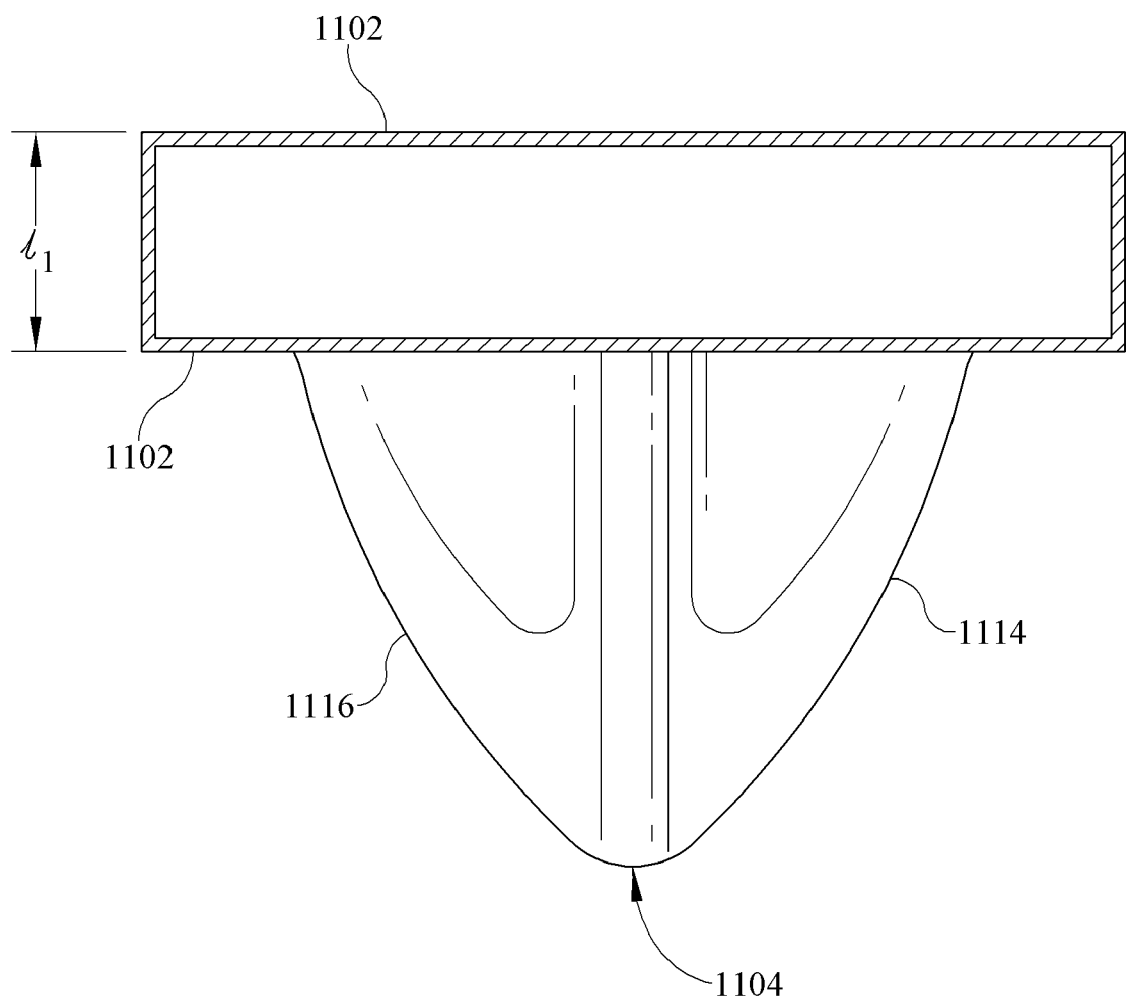
FIG. 17 is a sectional view of the soil conditioning device of FIG. 14.

Each of the peripheral ridge members 1103 has a length L. The ridge members are spaced apart substantially equally about the annular wheel or body 1102. Also, the ridge of the instant embodiment is not continuous, as best seen in FIG. 15, since the subridge members are not interposed between the ridge members 1103.

As with the previous embodiments, the valve 1112 is located in at least one peripheral ridge member 1103. The hollow peripheral ridge members 1103 and the hollow annular wheel or body 1102 are in fluid communication. Thus a fluid may be located in the soil condition device 1100 in part or in whole. As with the previous embodiment, the fluid may be at or above atmospheric pressure so that the curvature of the peripheral ridge members 1103 may be adjusted slightly. For example, it may be more desirable to utilize higher pressure for soils which are highly compacted while it may be desirable to use pressures which are closer to atmospheric pressure on soils which are nearly consolidated and as such, require less energy to pull the device through the sol thus offering a savings on the cost of fuel inputs to the tractor pulling the device.

Bulk density is measured as the density for a volume of soil as it exists naturally, including any air space and organic material in the soil volume. Bulk density is typically utilized to estimate differences in the level of compaction of a given soil. Due to different soil texture among wide varieties of soil, soils of different bulk density may be equally good for plant growth. Bulk density may be utilized to calculate water storage capacity and evaluate whether soil layers are too compacted to allow root penetration or adequate aeration.

Figure 18:
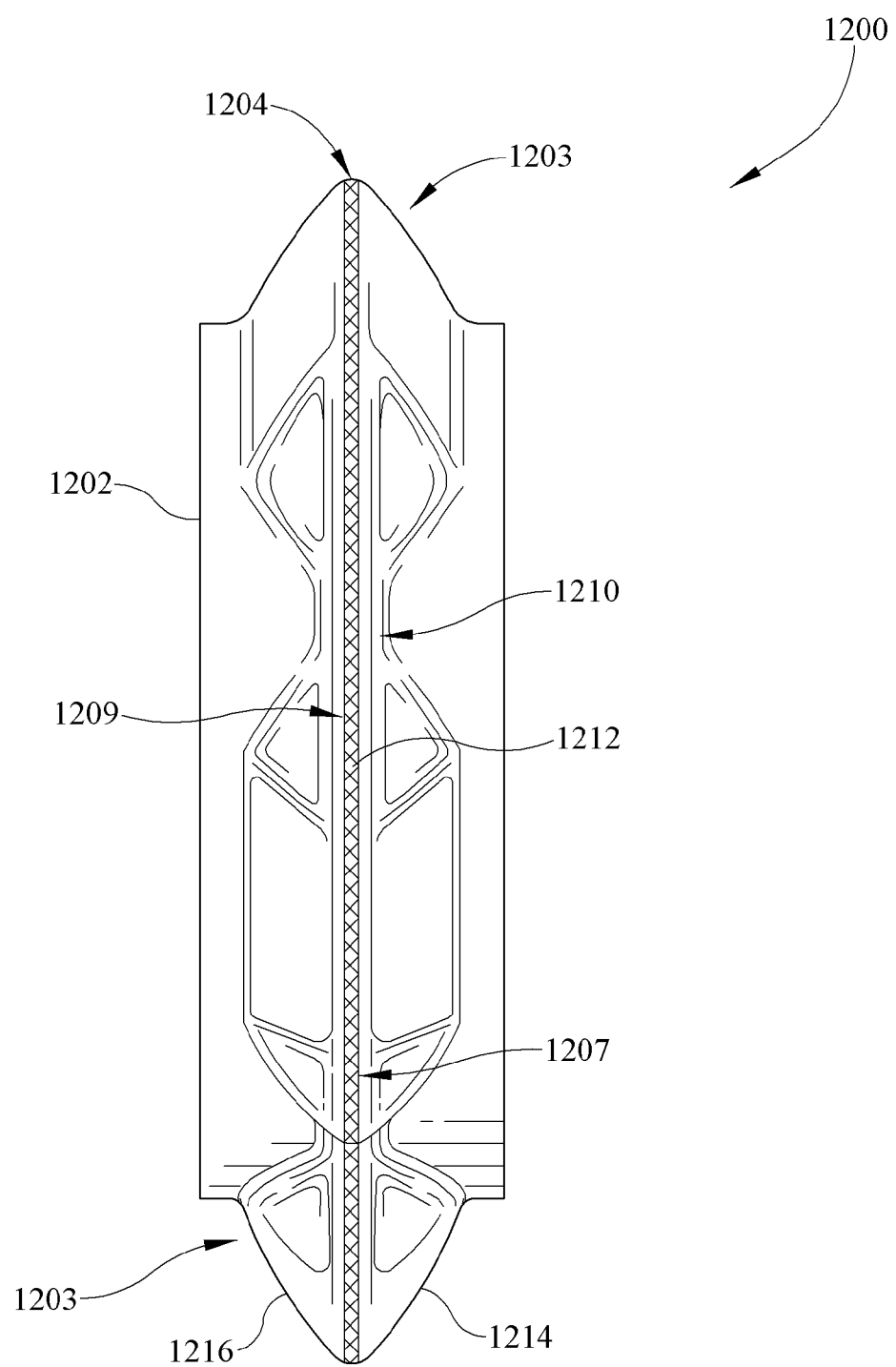
FIG. 18 is an end view of an alternate soil conditioning device including hardening material in the leading edge, upper edge and trailing edge of the ridge members.
Figure 19:
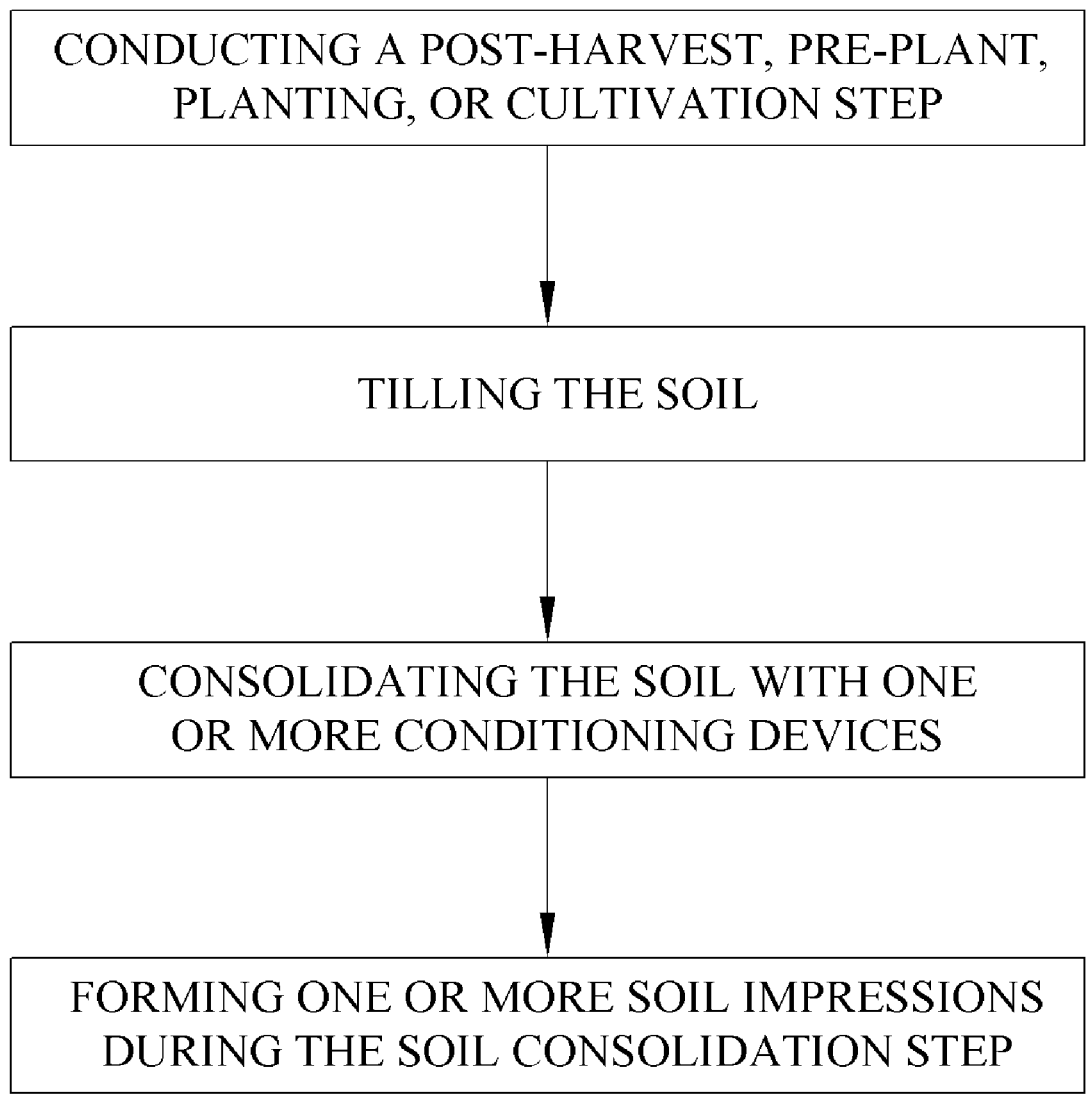
FIG. 19 is a flow chart depicting a process of using the soil conditioning device.

Referring now to FIG. 18, an alternate embodiment of the soil conditioning device 1200 is depicted. The soil conditioning device comprises an annular body 1202 and a plurality of ridge members 1203 joined by subridge members 1210. Each of the ridge members 1203 includes first and second sidewalls 1214, 1216. Each of the ridge members 1203 further comprises a leading edge 1207, a trailing edge 1209 and an upper edge 1204 extending there between. The soil conditioning device of FIG. 18 includes hardening material 1212 in at least one of the leading edge 1206, the upper edge 1204, and the trailing edge 1208. Alternatively, each of the leading, upper and trailing edges may include the hardening material 1212. The hardening material 1212 of the present embodiment may be some material which has a hardness greater than the material of the annular body 1202 and the other surfaces of the ridge members 1203. The hardening material 1212 may for example be ceramic material or metallic material, such as stainless steel. The hardening material 1212 may be in the form of one or more inserts or may be ground hardening materials, either of which may be disposed in the mold during formation of the soil conditioning device 1200. It should be understood by one skilled in the art, that although the device 1200 is shown with subridge members 1210, the hardening material 1212 may be utilized with an embodiment of the soil conditioning device not having the subridge members as shown in, for example, FIG. 14. These inserts would not substantially affect the flexibility of the ridge members.

Additionally, any of the embodiments described herein may include Teflon®, Teflon-like, or other low friction material impregnated into molded material defining the soil conditioning device. The low friction material component, in addition to the flexibility of the ridge member sidewalls allows a self-cleaning feature so that more soil material is maintained in the seedbed during operation, rather than the soil material being retained on the soil conditioning device.

Pore spaces in a soil consist of the portion of soil volume not occupied by solids. The bulk density and the pore space of the soil allow for aeration and water movement there through. Lower bulk densities and increased pore space also allows for insects and worms to travel through the soil which along with the improved interaction of hydrogen, carbon, and oxygen contribute to the breaking down of organic matter in the soil thus contributing to the improve levels of fertility in the soil. A further result of decreased soil bulk density and increased water fill pore space is the ease of water movement downward into the root zone and then continual force of gravity, downward still into subsoil and where permeable rock allows, down into any existing aquifers, thus allowing for the first time the creation of an artificial system of organic and sustainable aquifer replenishment which is achieved now only by intensive and expensive artificially created means. Bulk density may be thought of as a measure of pore space in the soil. The higher the bulk density for a given texture class of soil, the smaller the pore space present. Bulk density and pore space are related to consolidation such that consolidated soil has lower bulk density values and larger pore spaces than compacted soil. Soil structure plays a large role in the bulk density of the soil. As a rule, the higher the bulk density, the more compact the soil, the more poorly defined the structure, and the smaller amount of pore space. The resultant of these factors most often limited plant growth.

In order to achieve this desirable level of consolidation, through bulk density and pore space or soil architecture in general, the soil conditioning devices taught herein are utilized to achieve desirable soil architecture or structure. This means achieving desirable levels of soil consolidation through bulk density and pore space characteristics.

In operation, therefore, the soil condition devices 1000, 1100 are utilized to increase aeration, increase pore space, decrease bulk density and decrease clod sizes in the soil bed. The process requires that the soil be worked with the soil conditioning device at least one time per year. However, the process may occur several times a year, wherein additional soil processes with either soil conditioning device 1000, 1100 will result in the soil becoming more consolidated and less compact.

As previously indicated, the soil conditioning process may occur once per year or may occur several times per year with additional steps resulting in more consolidated soil. For example, the processing may occur at one or more of the following events: a) post harvest, b) spring pre-plant, c) planting, and/or d) cultivation. These occasions are merely exemplary as other occasions may be used to condition and consolidate the soil. After at least one of the above processes is carried out, the soil is tilled. This may be performed with known tilling devices and may include strip tilling, minimum tillage, conservation tillage and the like. Subsequently, one or more soil conditioning devices, 1000,1100, are moved along the soil surface in order to consolidate the soil by forming a plurality of impressions. These impressions define microbial wells which also aid in the aeration as well as increase pore space and decrease bulk density within the soil thereby increase the action of naturally occurring microbes in the soil which result in the increase of the fertility of the soil. Due to the resultant consolidation of the soil, the process allows water penetration therein and decreases the amount of runoff and erosion of the conditioned soil bed. Following a first process utilizing one of the soil conditioning devices taught herein, the soil clod sizes will average a first size depending upon the type of soil, its present bulk density levels, soil temperature levels and friability of the soil. However, following a second and subsequent processing the clod sizes will be smaller and will continue to decrease through continued use as the soil is continuously consolidated. Additionally, the pressure of a fluid within the soil conditioning device may be adjusted to compensate for various soil conditions. For example, the pressure within the soil conditioning device may be decreased as the soil becomes more consolidated.

Exemplary of the success of the soil conditioning device, the decrease in bulk density and increase in pore space has also resulted in an increase in soil surface area. Measurements indicate an increase in soil surface area of up to about thirty percent (30%). This increased soil surface area along with the reduced soil bulk density and the increased water fill pore space that results in the increased allowable usage of the naturally occurring elements of hydrogen, carbon, and oxygen. This, along with the improved soil fertility which is the direct result of the increased microbial action occurring in the imprints results in, for example, the increase in both the width and length of a leaf on a corn plant. For example on study has shown increased of up to thirty percent (30% on average). This increase in leaf width results in the increased surface area of the leaf which in turn results in the increased amount of photosynthesis that occurs within the plant. When this increase in leaf size is multiplied times twenty (the average number of leaves on a corn stalk) then the ability of the plant to produce at substantially high levels increases the size of the cob, the sugar content of the kernels, and the number of kernels.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A soil conditioning device, comprising a substantially hollow annular body, a plurality of substantially hollow peripheral ridge members extending from and in open communication with said substantially hollow annular body, said substantially hollow annular body and said plurality of substantially hollow peripheral ridge members being formed of a flexible lightweight material, each of said peripheral ridge members having a first surface and a second surface curved about a first horizontal axis and a second horizontal axis, said first and second side surfaces having thicknesses which vary from an upper edge of said peripheral ridge member to said substantially hollow annular body, said peripheral ridge member further having a leading prow shaped end and a trailing prow shaped end, said leading prow shaped end and said trailing prow shaped end each curved about two substantially perpendicular axes, said soil conditioning device being suitable for consolidating soil.

2. The soil conditioning device of claim 1 wherein said substantially hollow peripheral ridge members are joined by substantially hollow sub-ridge members forming a single ridge of varying height circumscribing said hollow annular body.

3. The soil conditioning device of claim 1, said first and second side surfaces each having a first thickness near said upper edge of said peripheral member.

4. The soil conditioning device of claim 3, said first and second side surfaces each having a second thickness substantially centrally positioned between said upper edge and a peripheral surface of said substantially hollow annular body.

5. The soil conditioning device of claim 1 having at least one polymeric material forming said substantially hollow ridge members.

6. The soil conditioning device of claim 1, said first surface and said second surface of said peripheral ridge members being flexible and moving between a first relaxed position and a second loaded position during movement of the soil conditioning device through soil.

7. The soil conditioning device of claim 1, said peripheral ridge members movable from a first relaxed extended position to a second retracted loaded position.

8. The soil conditioning device of claim 1 wherein said substantially hollow peripheral ridge members and said hollow annular body are in fluid communication.

9. The soil conditioning device of claim 8 wherein said substantially hollow interior of said hollow annular body has a filler selected from the group consisting of compressed gases, liquids, gels, solids, foams, and combinations thereof.

10. The soil conditioning device of claim 9 further having a valve for introduction of said filler material.

11. The soil conditioning device of claim 10, said valve being permanently sealed for retaining fluid in said soil conditioning device at a consistent level.

12. The soil conditioning device of claim 1 further comprising a ceramic material disposed in said upper edge of said ridge member for improving wear.

13. The soil conditioning device of claim 1 further comprising a metallic material disposed in said upper edge of said ridge member for improving wear.

14. The soil conditioning device of claim 1 further comprising a hardening material having a hardness greater than that of said hollow annular body for improved wear in a leading edge of said leading prow shaped end and said upper edge.

15. The soil conditioning device of claim 12 wherein said substantially hollow continuous outer peripheral ridge has a plurality of sections of said second height, each of said sections being interposed with a ridge member of a height varying between said first and second heights, each of said plurality of sections of a second height having an arc length about said wheels circumferential surface in a range of about 5 inches to 10 inches.

16. The soil conditioning device of claim 15 wherein said second height exceeds said first height in a range of approximately 1.5 inches to 5 inches.

17. A soil conditioning device comprising a substantially hollow wheel member having an outer circumferential surface, a centrally disposed substantially hollow continuous flexible outer peripheral ridge extending radially from said circumferential surface, said substantially hollow peripheral ridge and said substantially hollow wheel being formed of lightweight flexible material and each in open communication with the other, said substantially hollow peripheral ridge varying between first and second heights about said substantially hollow wheel member's circumferential surface, said first height and said second height being above said circumferential surface, said first height being less than said second height, said peripheral ridges of said second height having first and second curved sidewalls curving from said upper edge of said peripheral ridge of said second height to said circumferential surface.

18. The soil conditioning device of claim 17, said first and second curved sidewalls of said peripheral ridges of said second height having a thickness which varies between a first decreased thickness and a second increased thickness.

19. The soil conditioning device of claim 17 wherein each of said ridge sections of said second height have a leading edge and a trailing edge, said leading and trailing edges sloping toward said outer circumferential surface and said ridge section of a varying height forming a leading and trailing prow shaped surface.

20. The soil conditioning device of claim 17 further comprising a hardening material having a hardness greater than that of said hollow annular body for improved wear in said leading edge and said upper edge.

21. The soil condition device of claim 20, said leading edge having a ceramic insert.

22. The soil conditioning device of claim 20, said ridge member having a ceramic material disposed in said leading edge and said upper edge of said ridge member for improving wear.

23. The soil conditioning device of claim 20 further comprising metallic material in said leading edge and said upper edge of said ridge member for improving wear.

24. A device for creating a permeable soil surface having an increased surface area, comprising a substantially hollow round device having a plurality of substantially hollow peripheral ridge members, said round device and peripheral ridge members formed of lightweight flexible material, said substantially hollow round device and said substantially hollow peripheral ridge members being in open communication and each of said substantially hollow peripheral ridge members having a leading and trailing prow shaped surface positioned about said substantially hollow round device, each of said substantially hollow peripheral ridge members having a first side wall surface and a second side wall surface, each of said first side wall surface and said second side wall surface being curved from an upper edge of said peripheral ridge member to an peripheral surface of said substantially hollow round device, each of said side wall surfaces also curving inwardly forming a rounded leading edge where said leading edge curves downward from a top of said substantially hollow peripheral ridge member to said substantially hollow round device.

25. The device for creating permeable soil surface of claim 24, said first and second side wall surfaces having a first thickness and a second thickness.

26. The device for creating a permeable soil surface of claim 24 wherein each of said plurality of substantially hollow ridge members are interposed with a substantially hollow subridge member forming weirs in said soil, said substantially hollow subridge members having said first and second surfaces.

27. The device for creating a permeable soil surface claim 24 wherein said device is comprised of a flexible material that imparts a substantially consistent lateral force within said surface soil.

28. The device of claim 27 wherein said flexible material is a polymeric material.

29. The device of claim 28 wherein said polymeric material is selected from the group consisting of polyurethane foam, rubber, silicon rubber, synthetic rubber, urethane, HDPE, and combinations thereof.

30. The device of claim 29 wherein said polymeric material is HDPE.

31. A soil consolidating device, comprising a substantially hollow wheel with a circumferential surface having a plurality of substantially hollow flexible ridge members each defined by a first side wall and a second side wall, said first side wall and said second side wall each having a thickness which varies through a height of each of said plurality of substantially flexible ridge members, said substantially hollow wheel being in open communication with said substantially hollow ridge members, said hollow wheel and said ridge members being formed of a lightweight flexible material, each of said substantially hollow ridge members further having a ridge including a rounded leading edge at one end of said substantially hollow ridge member and a rounded trailing edge at an opposite end of said substantially hollow ridge member, a longitudinal axis generally defined between said leading edge and trailing edge of each of said substantially hollow ridge members, said rounded leading edge curved about said longitudinal axis and from said ridge to said circumferential surface, said rounded trailing edge curved about said longitudinal axis and from said ridge to said circumferential surface, wherein said first side wall curves to said second side wall and said ridge curves from an uppermost height to said circumferential surface.

32. The soil consolidating device of claim 31, said first side wall and said second side wall being curved about a substantially horizontal axis extending from said leading edge to said trailing edge.

33. The soil consolidating device of claim 31 wherein each of said plurality of substantially hollow ridge members are spaced about said circumferential surface of said wheel.

34. The soil consolidating device of claim 31 wherein said leading edge of a first substantially hollow ridge member joins a trailing edge of an adjacent substantially hollow ridge member forming a substantially hollow subridge interposing each of said substantially hollow ridge members.

35. A soil conditioning device, comprising:
a substantially hollow annular wheel member formed of a flexible lightweight material and having an outer surface;
a plurality of substantially hollow peripheral ridge members formed of said flexible lightweight material extending from said outer surface, said substantially hollow annular wheel and said plurality of substantially hollow peripheral ridge members in open communication;
each of said substantially hollow ridge members having a first surface and a second surface joining to form a ridge portion;
said first surface and said second surface each having a thickness which varies between said ridge portion and said wheel member;
said substantially hollow ridge members having a leading end curved from said outer surface to said ridge portion and from said first side to said second side;
said substantially hollow ridge members having a trailing end curved from said outer surface to said ridge portion and from said first side to said second side.

36. The soil conditioning device of claim 35, said first surface and said second surface being curved between said ridge portion and said wheel member.

37. The soil conditioning device of claim 35 further comprising a ridge extending continuously about said outer surface.

38. The soil conditioning device of claim 37 wherein said ridge continuously extending around said outer surface comprises a plurality of portions having a first height and a plurality of portions having a second height disposed between said plurality of portions having said first height.

39. A soil conditioning device suitable for creating a water permeable soil surface, comprising:
a substantially hollow annular wheel having an outer surface;
a plurality of substantially hollow peripheral ridge members extending from said outer surface;
said wheel and said peripheral ridge members being formed of a lightweight flexible material;

each of said substantially hollow ridge members having a first side surface joining with a second side surface forming a leading edge, an outer edge, and a trailing edge, said edges being rounded;

said first side surface and said second side surface each having variation in thickness and being curved from said outer surface of said annular wheel to said outer edge of said hollow ridge member;

said leading edge and said trailing edge each being curved from said outer edge to said outer surface of said substantially hollow annular wheel and from said first side surface to said second side surface.

40. A process for consolidating soil, comprising the steps of:

carrying out a process on a soil from the group consisting of:
a) post harvest processing;
b) spring pre-plant processing;
c) planting processing; and,
d) cultivation processing;

tilling said soil following at least one of said carrying out of said process;

consolidating said soil at least once with a soil conditioning device to increase aeration, pore space and decrease bulk density, said soil conditioning device comprising:

a substantially hollow annular body, a plurality of substantially hollow peripheral ridge members extending from and in open communication with said substantially hollow annular body, said substantially hollow annular body and said plurality of substantially hollow peripheral ridge members being formed of a flexible lightweight material, each of said peripheral ridge members having a first surface and a second surface curved about a first horizontal axis and a second horizontal axis, said first and second side surfaces having thicknesses which vary from an upper edge of said peripheral ridge member to said substantially hollow annular body, said peripheral ridge member further having a leading prow shaped end and a trailing prow shaped end, said leading prow shaped end and said trailing prow shaped end each curved about two substantially perpendicular axes, said soil conditioning device being suitable for consolidating soil.

41. The process of claim 40 further comprising varying the pressure within said soil conditioning device.

42. The process of claim 41 further comprising increasing or decreasing a fluid amount within said soil conditioning device.

43. A process for consolidating soil, comprising the steps of:

conducting a first processing step on a soil from the group consisting of:
a) post harvest processing;
b) spring pre-plant processing;
c) planting processing; and,
d) cultivation processing;

tilling said soil following said conducting of said first processing step;

consolidating said soil with said soil conditioning device to decrease clod sizes in said soil with a soil conditioning device, said soil conditioning device decreasing bulk density and increasing pore space, said soil conditioning device comprising:

a substantially hollow wheel member having an outer circumferential surface, a centrally disposed substantially hollow continuous flexible outer peripheral ridge extending radially from said circumferential surface, said substantially hollow peripheral ridge and said substantially hollow wheel being formed of lightweight flexible material and each in open communication with the other, said substantially hollow peripheral ridge varying between first and second heights about said substantially hollow wheel member's circumferential surface, said first height and said second height being above said circumferential surface, said first height being less than said second height, said peripheral ridges of said second height having first and second curved sidewalls curving from said upper edge of said peripheral ridge of said second height to said circumferential surface.

\* \* \* \* \*